(12) United States Patent
Toriumi

(10) Patent No.: US 8,106,939 B2
(45) Date of Patent: Jan. 31, 2012

(54) IMAGE PROCESSING METHOD, IMAGE PROCESSING DEVICE AND IMAGE DISPLAY APPARATUS EMPLOYING THE IMAGE PROCESSING DEVICE

(75) Inventor: Yoichi Toriumi, Tokyo (JP)

(73) Assignee: Sony Corporation, Tokyo (JP)

( * ) Notice: Subject to any disclaimer, the term of this patent is extended or adjusted under 35 U.S.C. 154(b) by 1419 days.

(21) Appl. No.: 11/553,345

(22) Filed: Oct. 26, 2006

(65) Prior Publication Data

US 2007/0097207 A1    May 3, 2007

(30) Foreign Application Priority Data

Nov. 2, 2005 (JP) ................. 2005-319728

(51) Int. Cl.
*H04N 13/04* (2006.01)
(52) U.S. Cl. ............... 348/51; 348/39; 348/42; 348/46
(58) Field of Classification Search .............. 348/39, 348/42, 46, 51
See application file for complete search history.

(56) References Cited

U.S. PATENT DOCUMENTS

| 5,581,276 | A | * | 12/1996 | Cipolla et al. | ............. 345/156 |
| 5,726,704 | A | * | 3/1998 | Uomori | ............. 348/47 |
| 6,157,733 | A | | 12/2000 | Swain | |

FOREIGN PATENT DOCUMENTS

| JP | 07-015748 | 1/1995 |
| JP | 07-220113 | 8/1995 |
| JP | 09-055959 | 2/1997 |
| JP | 11-239364 | 8/1999 |
| JP | 2000-512833 | 9/2000 |
| JP | 2001-045523 | 2/2001 |
| JP | 2003-143459 | 5/2003 |
| JP | 2003-281503 | 10/2003 |
| JP | 2003-304562 | 10/2003 |
| JP | 2004-40445 | 2/2004 |
| JP | 2004-242000 | 8/2004 |
| JP | 2004-343290 | 12/2004 |

OTHER PUBLICATIONS

Japanese Office Action issued on Sep. 8, 2009, for corresponding Japanese Patent Application JP 2005-319728.

* cited by examiner

*Primary Examiner* — Michael Won
(74) *Attorney, Agent, or Firm* — K&L Gates LLP

(57) ABSTRACT

An image processing method is provided. The method includes a process carried out by a pair of imagers to extract a parallax caused by a distance to an object of photographing as a positional shift between mutually corresponding pixels included in said imagers or between mutually corresponding image blocks included in the imagers as blocks conforming to the mutually corresponding pixels. The parallax is assigned to image data as a distance coefficient found on the basis of the positional shift between the mutually corresponding pixels or the mutually corresponding image blocks in the imagers.

11 Claims, 15 Drawing Sheets

MAIN & AUXILIARY IMAGER INTEGRATED LSI

IMAGE TAKING AND COORDINATE RECOGNITION (THE HORIZONTAL COORDINATE OF THE AUXILIARY ONE IS A +1 PRE-OFFSET COORDINATE)

MAIN (74)

AUXILIARY (75)

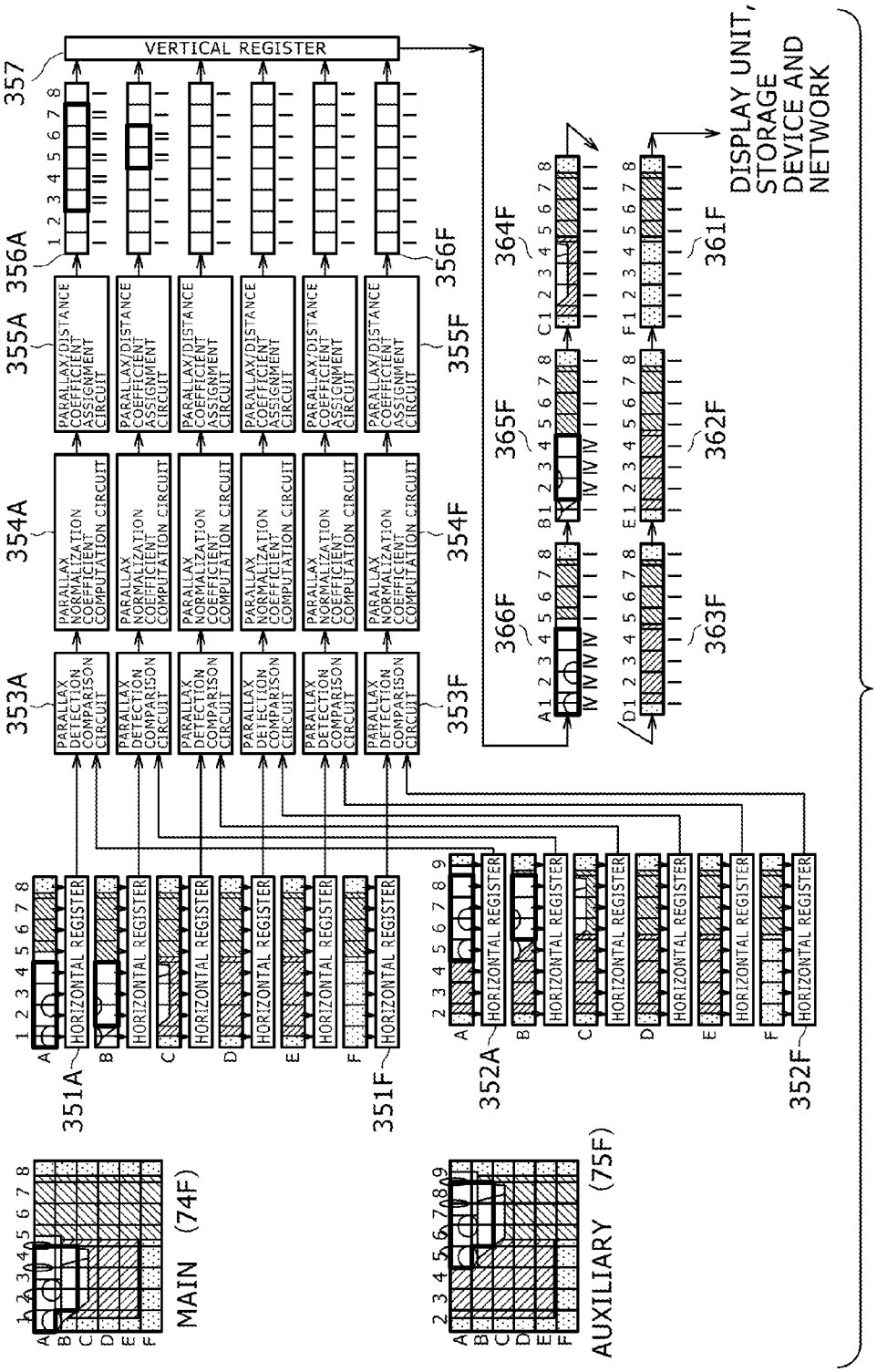
FIG. 11 THIRD TYPICAL IMAGE SHOWING PROCESSING TO EXTRACT PARALLAXES AND ASSIGN PARALLAX/DISTANCE COEFFICIENTS

FIG.12A  REPRODUCED IMAGE DATA
(WITH ASSIGNED PARALLAX/
DISTANCE COEFFICIENTS)

| α1 I | α2 I | α3 I | α4 I | α5 I | β1 I |   |
|---|---|---|---|---|---|---|
| β2 I | ι1 II | ι2 II | ι3 II | ι4 II | γ2 I |   |
| γ3 I | ι5 II | X IV | Y IV | κ3 II | δ3 I |   |
| δ4 I | κ4 II | Z IV | W IV | λ2 II | ε4 I |   |
| ε5 I | λ3 II | λ4 II | λ5 II | μ1 II | ζ5 I |   |
| η1 I | η2 I | η3 I | η4 I | η5 I | θ1 I |   |

FIG.12B  REPRODUCED IMAGE DATA
(3D EFFECT NORMAL PHASE)

| α1 | α2 | α3 | α4 | α5 | β1 |   |
|---|---|---|---|---|---|---|
|   | β2 | ι1 | ι2 | ι3 | ι4 | γ2 |
| γ3 | ι5 | X | Y | β3 | δ3 |   |
|   | δ4 | κ | Z | W | λ2 | ε4 |
| ε5 | λ3 | λ4 | λ5 | μ1 | ζ5 |   |
|   | η1 | η2 | η3 | η4 | η5 | θ1 |

FIG.12C  REPRODUCED IMAGE DATA
(3D EFFECT INVERTED PHASE)

|   | α1 | α2 | α3 | α4 | α5 | β1 |
|---|---|---|---|---|---|---|
| β2 | ι1 | ι2 | ι3 | ι4 | γ2 |   |
|   | γ3 | ι | X | Y | κ3 | δ3 |
| δ4 | κ4 | Z | W | ι2 | ε4 |   |
|   | ε5 | λ3 | λ4 | λ5 | μ1 | ζ5 |
| η1 | η2 | η3 | η4 | η5 | θ1 |   |

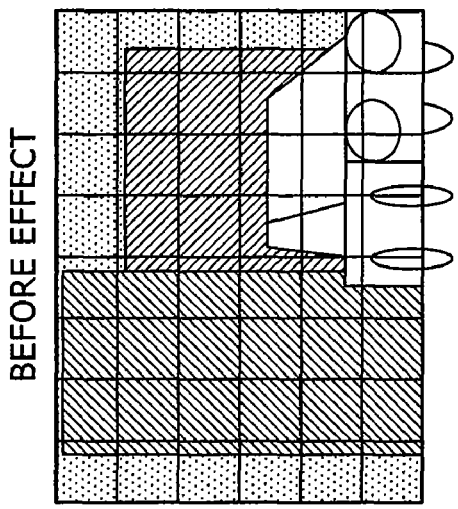
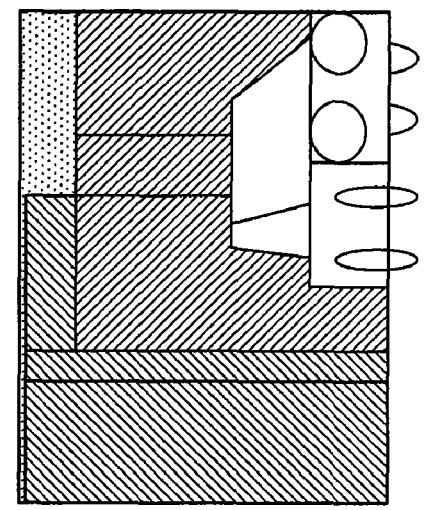
FIG. 13A
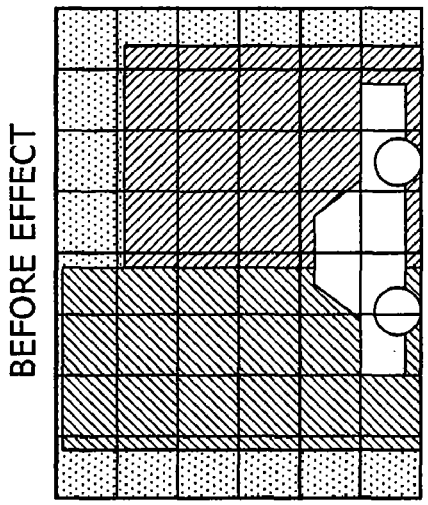
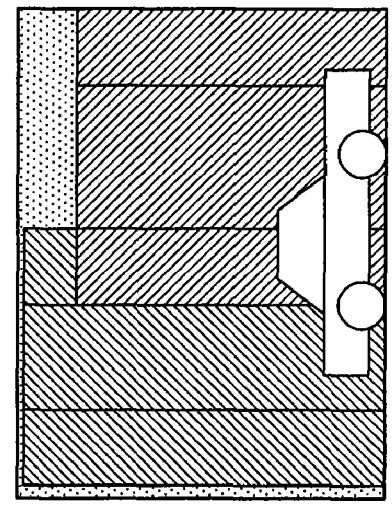
FIG. 13B
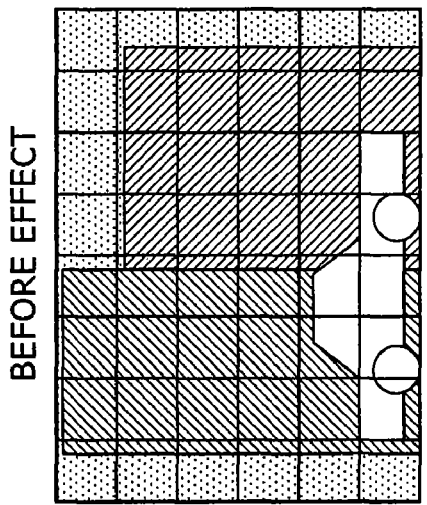
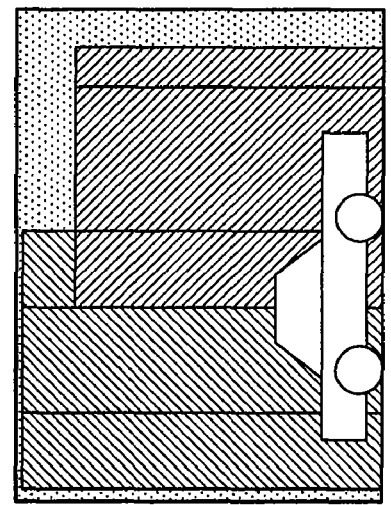
FIG. 13C FIG. 14A REPRODUCED IMAGE DATA
(WITH ASSIGNED PARALLAX/
DISTANCE COEFFICIENTS)
| α11 | α21 | α31 | α41 | α51 | β11 |
| β21 | ι11 | ι21 | ι31 | ι41 | γ21 |
| γ31 | ι51 | XIV | YIV | κ31 | δ31 |
| δ41 | κ41 | ZIV | WIV | λ21 | ε41 |
| ε51 | λ31 | λ41 | λ51 | μ11 | ζ51 |
| η11 | η21 | η31 | η41 | η51 | θ11 |
FIG. 14B REPRODUCED IMAGE DATA
(ZOOM IN)
| α1 | α2 | α3 | α4 | α5 | β1 |
| β2 | ι1 | ι2 | ι3 | ι4 | γ2 |
| γ3 | ι | X | Y | 3 | δ3 |
| δ4 | κ | Z | W | 2 | ε4 |
| ε5 | λ | λ4 | λ5 | μ1 | ζ5 |
| η1 | η2 | η3 | η4 | η5 | θ1 |
FIG. 14C REPRODUCED IMAGE DATA
(WITH AN ARBITRARY PHOTOGRAPHED
PORTION CUT OUT)
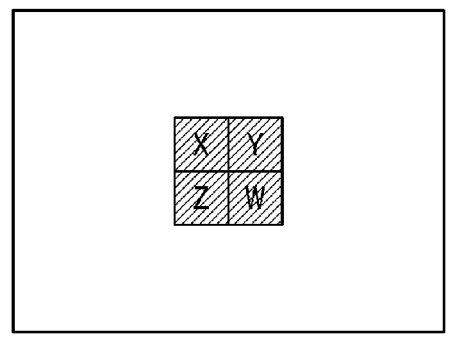

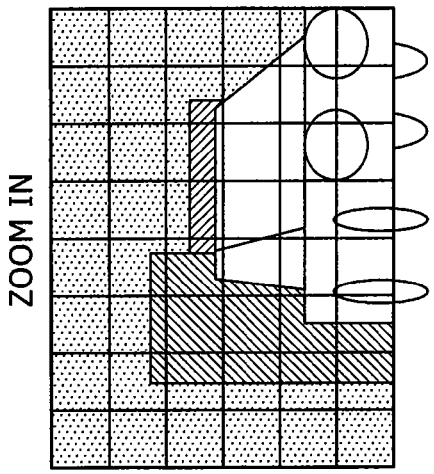
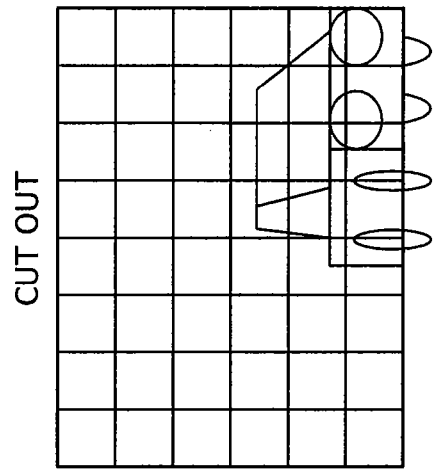
FIG.15A
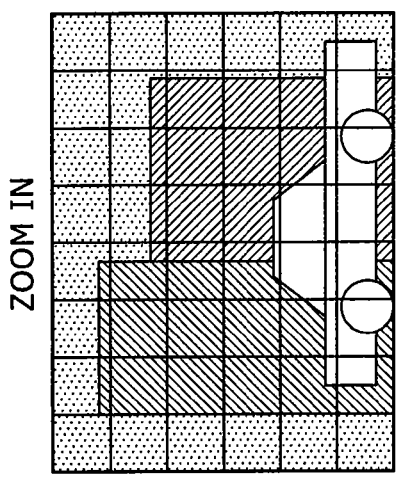
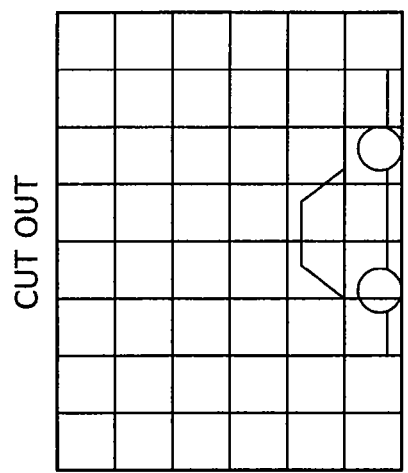
FIG.15B
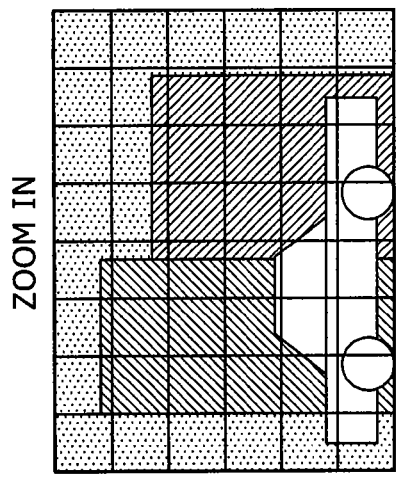
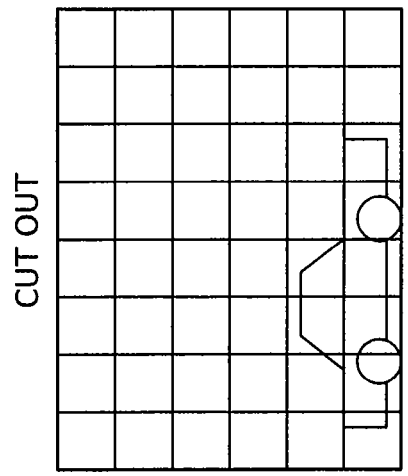
FIG.15C

IMAGE PROCESSING METHOD, IMAGE PROCESSING DEVICE AND IMAGE DISPLAY APPARATUS EMPLOYING THE IMAGE PROCESSING DEVICE

CROSS REFERENCES TO RELATED APPLICATIONS

The present application claims priority to Japanese Patent Application JP 2005-319728, filed in the Japanese Patent Office on Nov. 2, 2005, the entire contents of which is being incorporated herein by reference.

BACKGROUND

The present disclosure relates to an image processing method using a solid-state image-taking device such as a CCD (Charge Coupled Device) or a CMOS (Complementary Metal Oxide Semiconductor) device, an image processing device adopting the image processing method and an image display apparatus employing the image processing device. More particularly, the present disclosure relates to an image processing method for processing an image based on a parallax between the right and left eyes and displaying the processed image as a pseudo three-dimensional image on an ordinary display, an image processing device adopting the image processing method and an image display apparatus employing the image processing device.

In the case of a both-eye three-dimensional view generated by two cameras, special display means are required for reproducing the view. That is to say, display means obtained as a result of an optical effort to focus left image and right image respectively into the left eye and right eye of the observer is required. Due to the optical effort, however, a limitation on the visual-field angle is unavoidable. For this reason, it is difficult to allow a number of observers to look at a display shown by only one display apparatus.

In addition, there is also a technology of extracting a parallax and utilizing the parallax. However, this technology also requires a display in which a right image and a left image are created on the right and left eyes respectively.

For example, assuming an observer wears glasses, image data for the left eye of the observer and image data for the right eye of the same observer are alternately output to a display apparatus. At that time, the observer is capable of reproducing an image from the pieces of image data passing through the glasses capable of switching the shutter from the right glass to the left one and vice versa synchronously with the timing to switch the image data appearing on the display apparatus. By reproducing an image in this way, a three-dimensional image can be viewed.

Japanese Patent Laid-open No. 2004-343290 discloses a method of reproducing a 3D (three-dimensional) image without using glasses and an apparatus adopting the method. In accordance with this method, a three-dimensional display apparatus based on a parallax is employed. A 3D (three-dimensional) image is generated by alternately arranging an image for the right eye and an image for the left eye for every dot in the form of rectangles and the images of the two points of view are displayed as a 3D (three-dimensional) image by adoption of a parallax variable method or a lenticular method.

In the case of the parallax method, the display apparatus has a configuration including a slit and a display screen. The slit is placed in front of the display screen. The observer observes a 3D (three-dimensional) image appearing on the display screen through the slit. At that time, the left eye of the observer looks at only an image for the left eye while the right eye of the observer is looking at only an image for the right eye. In this way, the observer is capable of observing a 3D (three-dimensional) image with a feeling of seeing a 3D (three-dimensional) object.

As described above, in order to display a 3D (three-dimensional) image, it is necessary to particularly provide the display apparatus with a special component such as the slit.

On the other hand, Japanese Patent Laid-open No. 2004-40445 discloses an example of providing a portable information terminal with a 3D (three-dimensional) image displaying function. In the portable information terminal, a liquid-crystal module capable of displaying a 3D (three-dimensional) image includes a backlight, a switching liquid-crystal device, a phase difference board and a TFT liquid crystal. The switching liquid-crystal device is a component capable of switching its polarization angle. The phase difference board is a component patterned to form a slit shape. A 3D (three-dimensional) image is displayed by changing a phase relation with the patterned phase difference board. The phase relation with the patterned phase difference board is changed by switching the polarization angle of the switching liquid-crystal device from one value to another. In this way, a left image is generated by left pixels but prevented from being projected on the right eye by being cut off from the right eye. On the other hand, a right image is generated by right pixels but prevented from being projected on the left eye by being cut off from the left eye. In this state, only the image for the right eye appears on the right eye and only the image for the left eye appears on the left eye. Thus, an image appearing on the right eye of the observer is different from an image appearing on the left eye of the observer. As a result, the observer is capable of sensing a 3D (three-dimensional) image having a depth in the inward direction.

In this case, however, the display apparatus requires special units such as the phase difference board and the switching liquid-crystal device capable of switching its polarization angle.

For a both-eye 3D (three-dimensional) view generated by using two cameras, it is necessary to employ a special display apparatus to be used in a process to reproduce the 3D (three-dimensional) image. The structure of the display apparatus is complicated and the visual-field angle is also limited too. Thus, it is difficult to allow a number of observers to look at a display shown by only one display apparatus.

SUMMARY

Addressing the problem described above, the present disclosure provides an image display apparatus capable of carrying out image processing at a speed higher than the speed of the ordinary parallax image configuration by performing parallel processing such as a process to compare a signal output from every horizontal register employed in a main imager with a signal output from the corresponding horizontal register employed in an auxiliary imager integrated with the main imager in a single LSI (Large Scale Integrated) circuit in order to produce an image of high minuteness and a high rate.

By using such an LSI circuit including main and auxiliary imagers as well as an image processing device, it is possible to realize a Camcoder (a registered trademark of Sony Corporation) and a digital still camera, which are capable of creating a pseudo 3D (three-dimensional) image by also recording information on parallaxes and distances along with image data.

In accordance with an image processing method according to one embodiment, the method includes a process carried out by a pair of imagers to extract a parallax caused by a distance to an object of photographing as a positional shift between mutually corresponding pixels included in the imagers or between mutually corresponding image blocks included in the imagers as blocks conforming to the mutually corresponding pixels, the parallax is assigned to image data as a distance coefficient found on the basis of the positional shift between the mutually corresponding pixels or the mutually corresponding image blocks in the imagers.

An image processing device according to another embodiment, the device includes a pair of imagers for extracting pieces of image data with different parallaxes caused by a distance to an object of photographing; and an image processing circuit for processing the pieces of image data with different parallaxes generated by the imagers. The imagers and the image processing circuit are constructed in the same integrated circuit chip.

The image processing device is further characterized in that the image processing device generates pieces of image data with different parallaxes. In the device, a process is carried to assign a distance coefficient to the pieces of image data, the coefficient being obtained by extracting the parallaxes each according to a positional shift between a pixel or image block conforming to the pixel generating the piece of image data on one of the imagers and a corresponding pixel or image block conforming to the corresponding pixel generating the piece of image data on the other one of the imagers, and the image data is converted into output data in accordance with the assigned distance coefficients.

An image display apparatus according to an embodiment, includes a pair of imagers for extracting pieces of image data with different parallaxes each caused by a distance to an object of photographing. The apparatus further includes a coefficient assignment circuit for carrying out a process on pieces of image data with different parallaxes output by the imagers to assign a distance coefficient to the pieces of image data, the coefficient being obtained by extracting the parallaxes each according to a positional shift between a pixel or image block conforming to the pixel generating the piece of image data on one of the imagers and a corresponding pixel or image block conforming to the corresponding pixel generating the piece of image data on the other one of the imagers. The apparatus still further includes an image processing circuit for creating a pseudo three-dimensional image from image data output by the coefficient assignment circuit, and an image display unit for displaying the pseudo three-dimensional image generated by the image processing circuit.

In accordance with an embodiment of the image processing method, the image processing device adopting the image processing method and the image display apparatus employing the image display device, a signal output by a horizontal register employed in a main imager and a signal output by a corresponding horizontal register employed in an auxiliary imager constructed in the same (imager) LSI circuit as the main imager are compared with each other in parallel processing so that the image display apparatus is capable of carrying out image processing to produce an image of high minuteness and a high rate at a speed higher than the speed of the ordinary parallax image configuration.

By using an LSI circuit including such imagers, it is possible to realize a Camcoder (a registered trademark of Sony Corporation) and a digital still camera, which are capable of recording information on parallaxes and distances along with image data.

In addition, in accordance with the image processing method provided by the present invention, by using a parallax/distance coefficient based on a parallax, a 3D (three-dimensional) pseudo effect can be obtained even with only one eye. Thus, limitation on the visual-field angle is eliminated so that special means such as a both-eye 3D (three-dimensional) viewer is no longer required.

Therefore, it is possible to provide a number of observers, who have different powers to view a display as well as a difference in visual ability between the two eyes, with a 3D (three-dimensional) effect of an image display in spite of the fact that the image display is a pseudo display.

By adoption of such an image processing method, entertaining contents such as a private movie and a private video, which are produced at home, can be emphasized into a 3D (three-dimensional) display and, in addition, a 3D (three-dimensional) attendance feeling and a speed sense can be stressed in the case of a game image.

Additional features and advantages are described herein, and will be apparent from, the following Detailed Description and the figures.

BRIEF DESCRIPTION OF THE FIGURES

FIG. 11 is a diagram showing further typical parallel processing to extract parallaxes from image data and assign parallax/distance coefficients found from the parallaxes to the image data;

FIG. 12A is a diagram showing data including parallax/distance coefficients as data of a reproduced image;

FIG. 12B is a diagram showing data led by adopting a method of processing the image data to demonstrate a pseudo 3D (three-dimensional) effect;

FIG. 12C is a diagram showing another data led by adopting method of processing image data to demonstrate a pseudo 3D (three-dimensional) effect;

FIG. 13A is a diagram showing images demonstrating a pseudo 3D (three-dimensional) effect produced by the typical parallel processing explained by referring to FIG. 9;

FIG. 13B is a diagram showing images demonstrating a pseudo 3D (three-dimensional) effect produced by the other typical parallel processing explained by referring to FIG. 10;

FIG. 13C is a diagram showing images demonstrating a pseudo 3D (three-dimensional) effect produced by the further typical parallel processing explained by referring to FIG. 11;

FIG. 14A is a diagram showing data produced with assigned parallax/distance coefficients as data of a reproduced image;

FIG. 14B is a diagram showing a result of extracting image data with the parallax/distance coefficient of IV from the data shown in FIG. 14A and enlarging an image represented by the extracted image data;

FIG. 14C is a diagram showing an image obtained as a result of extracting only image data with the parallax/distance coefficient of IV from the data shown in FIG. 14A;

FIG. 15A is an explanatory diagram to be referred to in description of a function to cut out a portion from an image produced by the typical parallel processing explained by referring to FIG. 9;

FIG. 15B is an explanatory diagram to be referred to in description of a function to cut out a portion from an image produced by the other typical parallel processing explained by referring to FIG. 10; and FIG. 15C is an explanatory diagram to be referred to in description of a function to cut out a portion from an image produced by the further typical parallel processing explained by referring to FIG. 11.

DETAILED DESCRIPTION

Figure 1A:
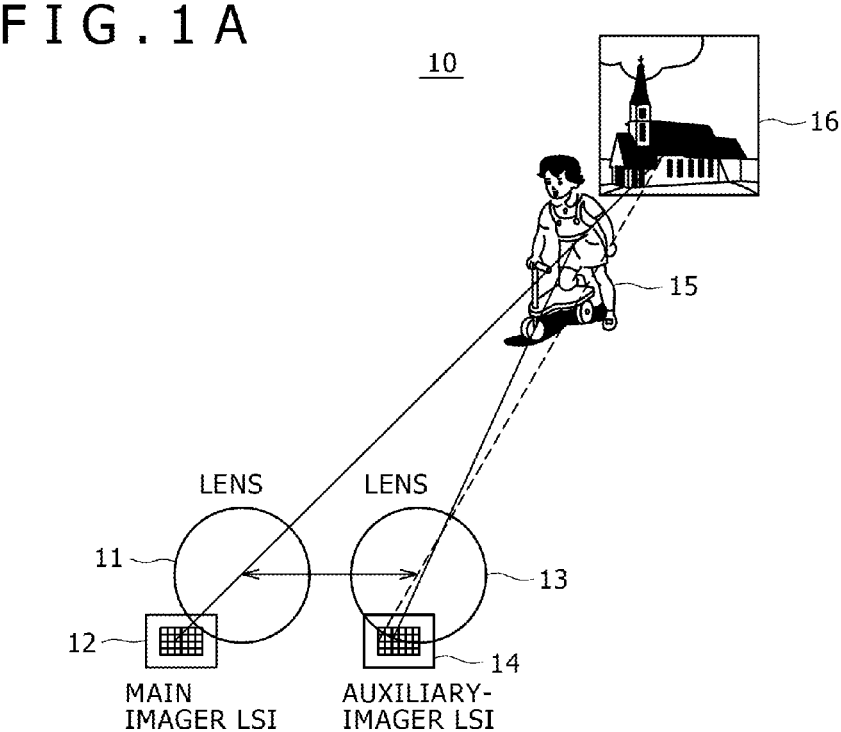
FIG. 1A is a diagram showing the configuration of a parallax-detection image-taking system.
Figure 1B:
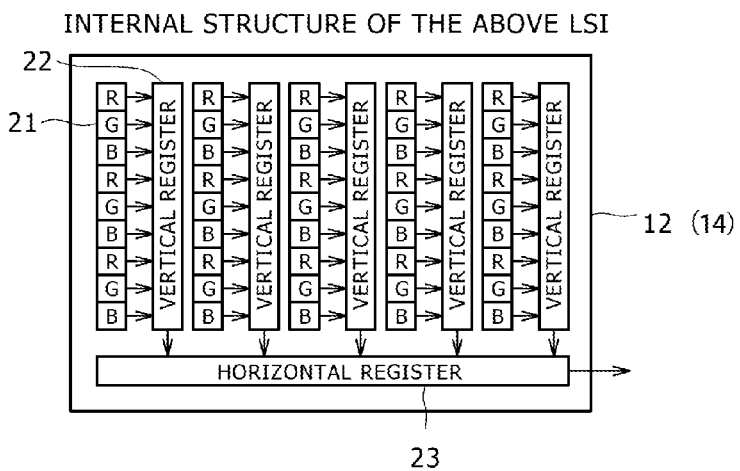
FIG. 1B is a diagram showing the structure of an LSI chip employed in the parallax-detection image-taking system.

FIGS. 1A and 1B are a diagram showing a parallax-extraction image-taking system 10 for extracting a parallax by using a pair of imagers in accordance with an embodiment. The parallax-extraction image-taking system 10 shown in FIGS. 1A and 1B has a configuration including a plurality of imager LSI chips. A typical configuration shown in the figure includes two imager LSI chips 12 and 14 serving as main and auxiliary imagers respectively. An imager image processing device not shown in the figure is connected to the two imager LSI chips 12 and 14 and includes an image processing circuit for carrying out image processing on main image data and auxiliary image data, which are output by the two imager LSI chips 12 and 14 respectively.

A lens 11 projects an optical signal representing an image of a photographing object 15 located at a first distance from the position of the lens 11 on an image-taking face of the main-imager LSI chip 12. By the same token, a lens 13 projects an optical signal representing an image of another photographing object 16 located at a second distance from the position of the lens 13 on an image-taking face of the auxiliary-imager LSI chip 14.

Typically, the two imager LSI chips 12 and 14 are each a solid-state image-taking device such as a CCD (Charge Coupled Device) or a CMOS (Complementary Metal Oxide Semiconductor) device. The two imager LSI chips 12 and 14 each have a configuration including a number of pixels. The main-imager LSI chip 12 converts a pixel optical signal leaving the lens 11 for the main-imager into an electrical signal. By the same token, the auxiliary-imager LSI chip 14 converts a pixel optical signal leaving the lens 13 for the auxiliary-imager into an electrical signal.

FIG. 1B is a diagram showing a typical main-imager LSI chip 12 (or a typical auxiliary-imager LSI chip 14) implemented by a CMOS device. In the vertical direction, RGB pixels are laid out repeatedly to form a pixel array 21 serving as a column of the main-imager LSI chip 12 (or the auxiliary-imager LSI chip 14). The pixel arrays 21 are laid out repeatedly in the horizontal direction (or the row direction) alternately with vertical registers 22. A predetermined number of pixel arrays 21 are laid out alternately with the same number of vertical registers 22 in the row direction to form the so-called pixel matrix. An optical signal hitting a pixel is converted into an electrical signal, which is then transferred to a vertical register 22 adjacent to the pixel array 21 including the pixel synchronously with a clock signal generated by a timing generator.

An AD (analog-to-digital) converter converts a signal output by a vertical register 22 into a digital signal, which is supplied to a horizontal register 23 before being output from the main-imager LSI chip 12 (or the auxiliary-imager LSI chip 14) with a predetermined timing.

The digital signals output from the main-imager LSI chip 12 and the auxiliary-imager LSI chip 14 are supplied to a signal processing circuit not shown in the figure as main-image data and auxiliary-image data respectively. The signal processing circuit then processes the main-image data and the auxiliary-image data in order to generate a pseudo 3D (three-dimensional) image. An image processing method for processing the main-image data and the auxiliary-image data will be described later along with an image processing device adopting the image processing method.

As described above, a parallax-extraction image-taking system provided with the two imager LSI chips 12 and 14 forming a pair of main and auxiliary imagers as shown in FIG. 1A needs the lenses 11 and 13 in addition to the two imager LSI chips 12 and 14 forming a pair of imagers each serving as a sensor in order to recognize distances to the objects of photographing. In this case, the two imager LSI chips 12 and 14 are LSI chips independent of each other. Normally, the two imager LSI chips 12 and 14 each output data of an image obtained as a result of an image-taking process as a serial electrical signal by way of vertical registers and a horizontal register. It is to be noted that, in another configuration of the main-imager LSI chip 12 (or the auxiliary-imager LSI chip 14), horizontal registers are placed at positions preceding the position of a vertical register.

In accordance with an embodiment, a serial main-image signal output by the main-imager LSI chip 12 and a serial auxiliary-image signal output by the auxiliary-imager LSI chip 14 are compared with each other in order to detect parallaxes in image processing to be described later.

The figure shows the main-imager LSI chip 12 on the left side and the auxiliary-imager LSI chip 14 on the right side, and the following description assumes these positions of the main-imager LSI chip 12 and the auxiliary-imager LSI chip 14. It is worth noting, however, that the positions of the main-imager LSI chip 12 and the auxiliary-imager LSI chip 14 can be reversed.

Figure 2A:
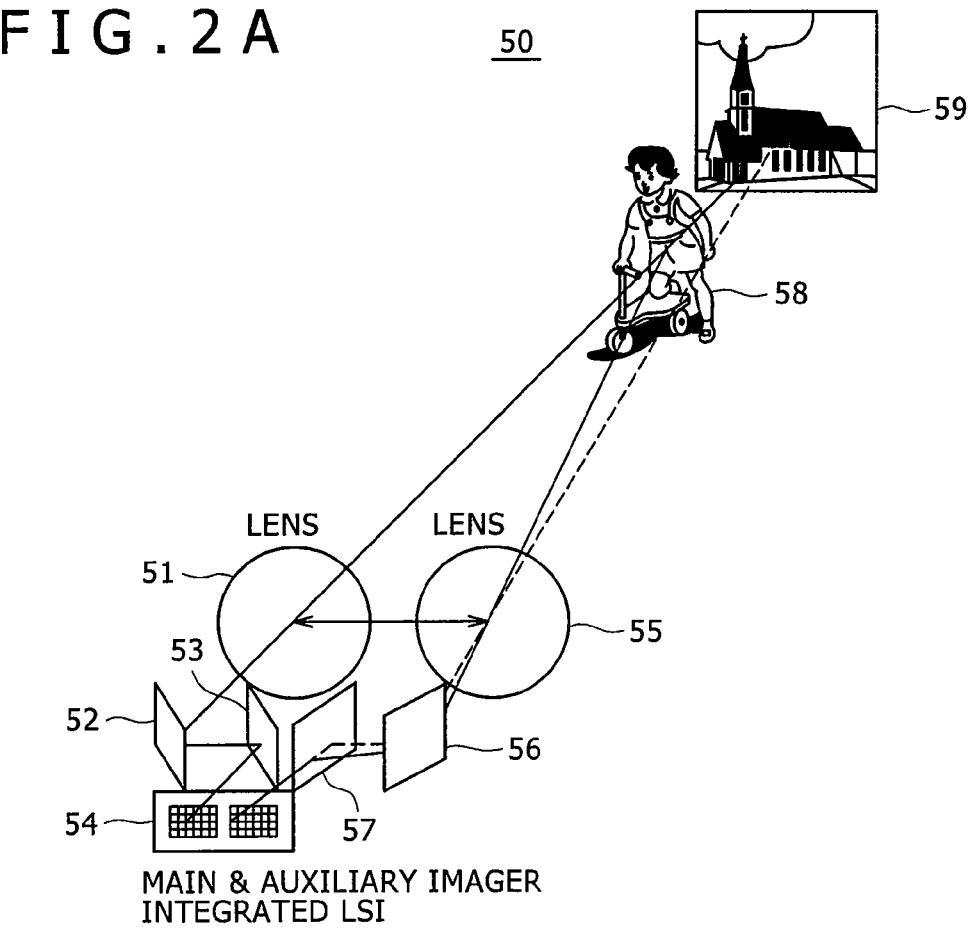
FIG. 2A is a diagram showing the configuration of another parallax-detection image-taking system.
Figure 2B:
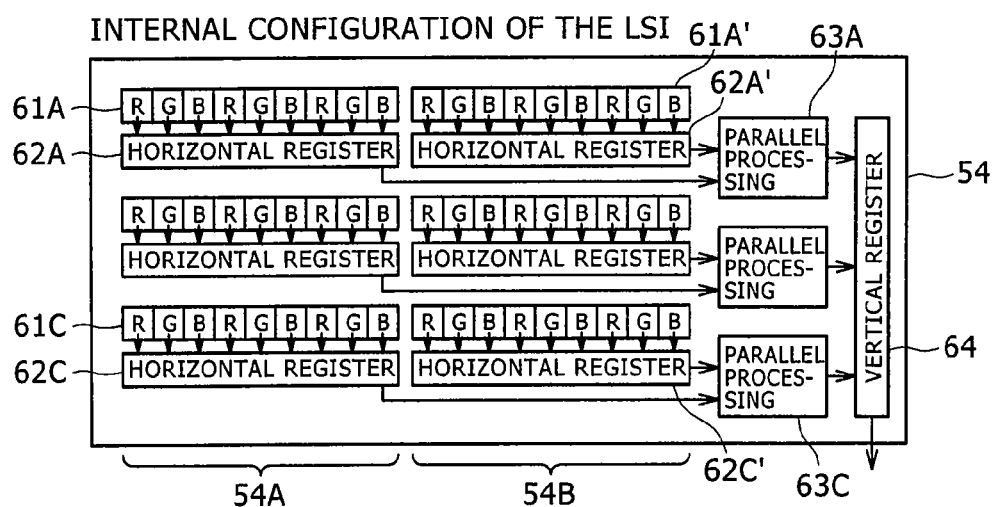
FIG. 2B is a diagram showing the structure of an LSI chip employed in the other parallax-detection image-taking system.

FIGS. 2A and 2B are a diagram roughly showing a parallax-extraction image-taking system 50 employing a single imager LSI in accordance with another embodiment of the present invention. Reference numeral 54 denotes the imager LSI, including a main imager 54A and an auxiliary imager 54B. As described earlier, the main imager 54A and the auxiliary imager 54B are each typically a solid-state image-taking device such as a CCD or a CMOS device. In this typical case of the embodiment, the main imager 54A and the auxiliary imager 54B are constructed in one LSI chip implemented by a CMOS device.

The parallax-extraction image-taking system 50 shown in FIG. 2A includes a first photographing object 58 at a position relatively close to lenses 51 and 55 and a second photographing object 59 at a position relatively far from the lenses 51 and 55. Light beams generated by the first photographing object 58 and the second photographing object 59 are subjected to an image-taking process after passing through the lenses 51 and 55. The light beams representing the images of the first photographing object 58 and the second photographing object 59 are reflected by reflection plates 52 and 53 each serving as a mirror after being passed by the lens 51, and enter the main imager 54A included in the integrated LSI chip 54. By the same token, the light beams representing the images of the first photographing object 58 and the second photographing object 59 are reflected by reflection plates 56 and 57 each serving as a mirror after being passed by the lens 55, and enter the auxiliary imager 54B included in the integrated LSI chip 54.

That is to say, since a pair of main and auxiliary imagers 54A and 54B are incorporated in a single LSI chip 54, by employing the reflection plates 52, 53, 56 and 57 in the configuration of the parallax-extraction image-taking system 50, the first photographing object 58 and the second photographing object 59 can be projected on a light receiving area in the LSI chip 54 even though the main and auxiliary imagers 54A and 54B are separated from each other.

FIG. 2B is a block diagram showing the integrated LSI chip 54 including the main imager 54A, the auxiliary imager 54B and an image processing device in accordance with this embodiment. As described above, the main imager 54A, the auxiliary imager 54B and the image processing device are integrated in a single LSI chip 54 implemented by a CMOS device. The block diagram is simplified in order to make the explanation or the LSI chip 54 simple.

The main imager 54A has pixel rows 61A, 61B and 61C, which are each oriented in the horizontal direction. For the pixel rows 61A, 61B and 61C, the LSI chip 54 also includes horizontal registers 62A, 62B and 62C respectively. By the same token, the auxiliary imager 54B has pixel rows 61A', 61B' and 61C', which are each oriented in the horizontal direction. For the pixel rows 61A', 61B' and 61C', the LSI chip 54 also includes horizontal registers 62A', 62B' and 62C' respectively.

The outputs of the horizontal register 62A for the main imager 54A and the horizontal register 62A' for the auxiliary imager 54B are connected to a parallel processing circuit 63A. By the same token, the outputs of the horizontal register 62B for the main imager 54A and the horizontal register 62B' for the auxiliary imager 54B are connected to a parallel processing circuit 63B. In the same way, the outputs of the horizontal register 62C for the main imager 54A and the horizontal register 62C' for the auxiliary imager 54B are connected to a parallel processing circuit 63C.

The outputs of the parallel processing circuits 63A, 63B and 63C are connected to a vertical register 64, for sequentially receiving processing results from the parallel processing circuits 63A, 63B and 63C. In the figure three pixel arrays and the three corresponding horizontal registers composing a total of six rows are shown. In actuality, however, more rows can be provided to obtain the required resolution.

As described above, the LSI chip 54 has the main imager 54A and the auxiliary imager 54B each serving as a sensor. On each pixel row oriented in the horizontal (or x-axis) direction in the area of the sensors, typically, a predetermined number of pixels are laid out and, in the vertical direction, such pixel rows are laid out alternately with the horizontal registers.

On each of the pixel rows, typically, R, G and B pixels are laid out repeatedly and connected to a horizontal register associated with the pixel row. Each of the pixels employs a row select transistor, a reset transistor, an amplification transistor and a photodiode.

In order to read out an output signal, which is generated by a pixel when the pixel is driven, every row is also provided with a noise canceller, a signal read transistor, the horizontal register and an AD (Analog-to-Digital) converter, which are not shown in the figure. The output of the AD converter is connected to the horizontal register provided for the row.

At places surrounding the R, G and B pixels, a horizontal scanning circuit for selecting a column and a vertical scanning circuit for selecting a row are provided as a horizontal driving system and a vertical driving system respectively, but the horizontal scanning circuit for selecting a column and the vertical scanning circuit are not shown in the figure. Typically, each of the horizontal scanning circuit and the vertical scanning circuit includes a horizontal register, which starts a shift operation to scan columns or rows synchronously with a driving pulse generated by a TG (timing generator) also not shown in the figure.

The horizontal scanning circuit sequentially generates horizontal scan (select) pulses to be supplied to column read lines and column signal lines. A pixel signal read out from a specific pixel selected by a column read line and a row select line is output to the column signal line.

On the other hand, the vertical scanning circuit sequentially generates vertical scan pulses to be supplied to row select lines to sequentially select pixel rows, which are laid out in the vertical direction.

An image signal read out from a column signal line is supplied typically to a CDS (Correlation Double Sampling) circuit serving as a difference computation circuit for carrying out a process to find a difference generated right after a pixel reset operation on the basis of sampling pulses generated by the timing generator as a difference between a noise level and a signal level. At the stage following the CDS circuit, components such as an AGC (Automatic Gain Control) circuit and an ADC (Analog Digital Converter) circuit are provided.

Digital signals output by the ADC circuits as signals representing image data are supplied to the horizontal registers 62A to 62C and 62A' to 62C'. The pieces of image data supplied to the horizontal registers 62A to 62C are sequentially passed on to the parallel processing circuits 63A to 63C respectively and the image data supplied to the horizontal registers 62A' to 62C' are also sequentially passed on to the parallel processing circuits 63A to 63C respectively. The parallel processing circuits 63A to 63C carry out a process to detect pixel shifts caused by parallaxes and other processing.

The parallax-extraction image-taking system 50 based on a monolithic imager as shown in FIGS. 2A and 2B is configured to include the main imager 54A and the auxiliary imager 54B on the same substrate of the LSI chip so as to function as an image-taking system for extracting a parallax and a distance. In this case, the single LSI chip 54 serving as imagers can be constructed into a configuration in which a signal generated by a horizontal register employed in the main imager 54A and a signal generated by the corresponding horizontal register employed in the auxiliary imager 54B are compared with each other for every pair of a horizontal register and a corresponding horizontal register in parallel processing carried out at the same time for all the pairs.

The method adopted in this configuration as a technique, in which a parallax in the horizontal direction is extracted and, then, data is output serially through a vertical register, allows the image processing to be carried out at a high speed and results in an image of high minuteness and a high rate in comparison with the configuration of the parallax-extraction image-taking system 10 shown in FIGS. 1A and 1B.

In addition to merits described later as merits in the image processing, the LSI configuration including the main imager, the auxiliary imager and the parallel comparison/processing circuit, which are integrated in one chip, also has system-configuration merits and manufacturing merits.

It is to be noted that the distance between lenses for extracting a parallax should be normally set at a value greater than the distance between the main and auxiliary imagers integrated in one LSI chip. For this reason, an optical system having the inter-lens distance matching the inter-imager distance is obviously desired.

Figures 3A, 3B, 3C:
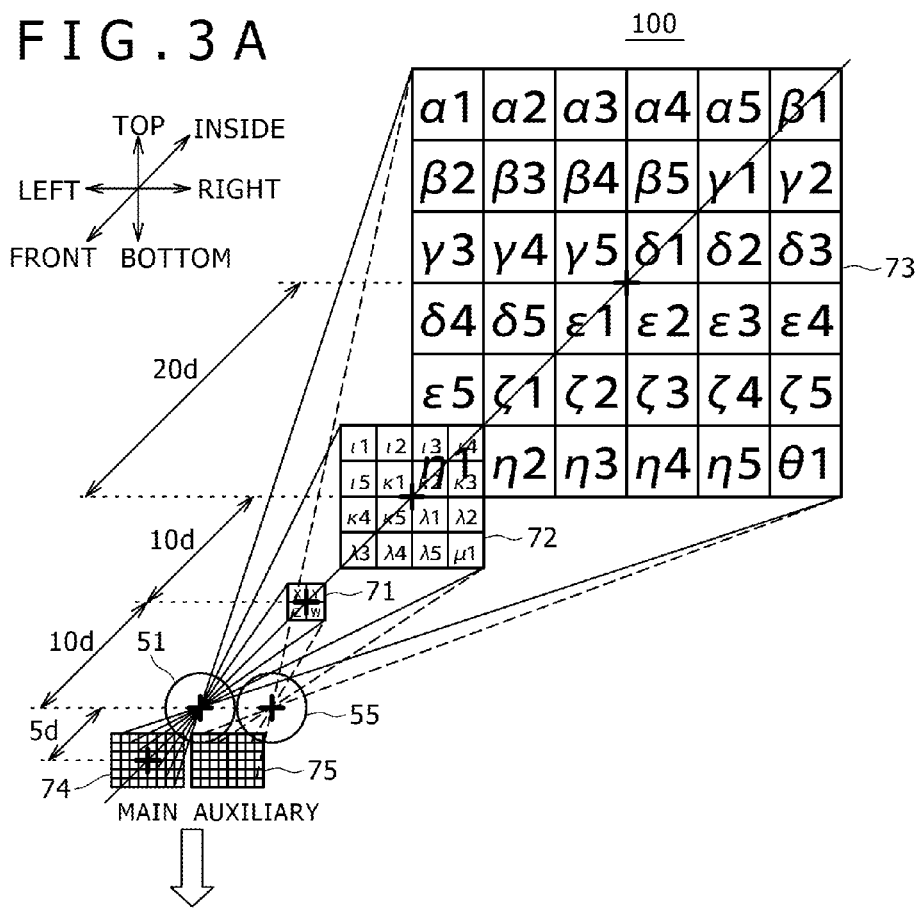
FIG. 3A is a diagram showing the configuration of a parallax-detection image-taking system for producing a 3D (three-dimensional) display.
FIGS. 3B and 3C are diagrams respectively showing a structure of main and auxiliary imagers employed in the parallax-detection image-taking system.
Figure 4:
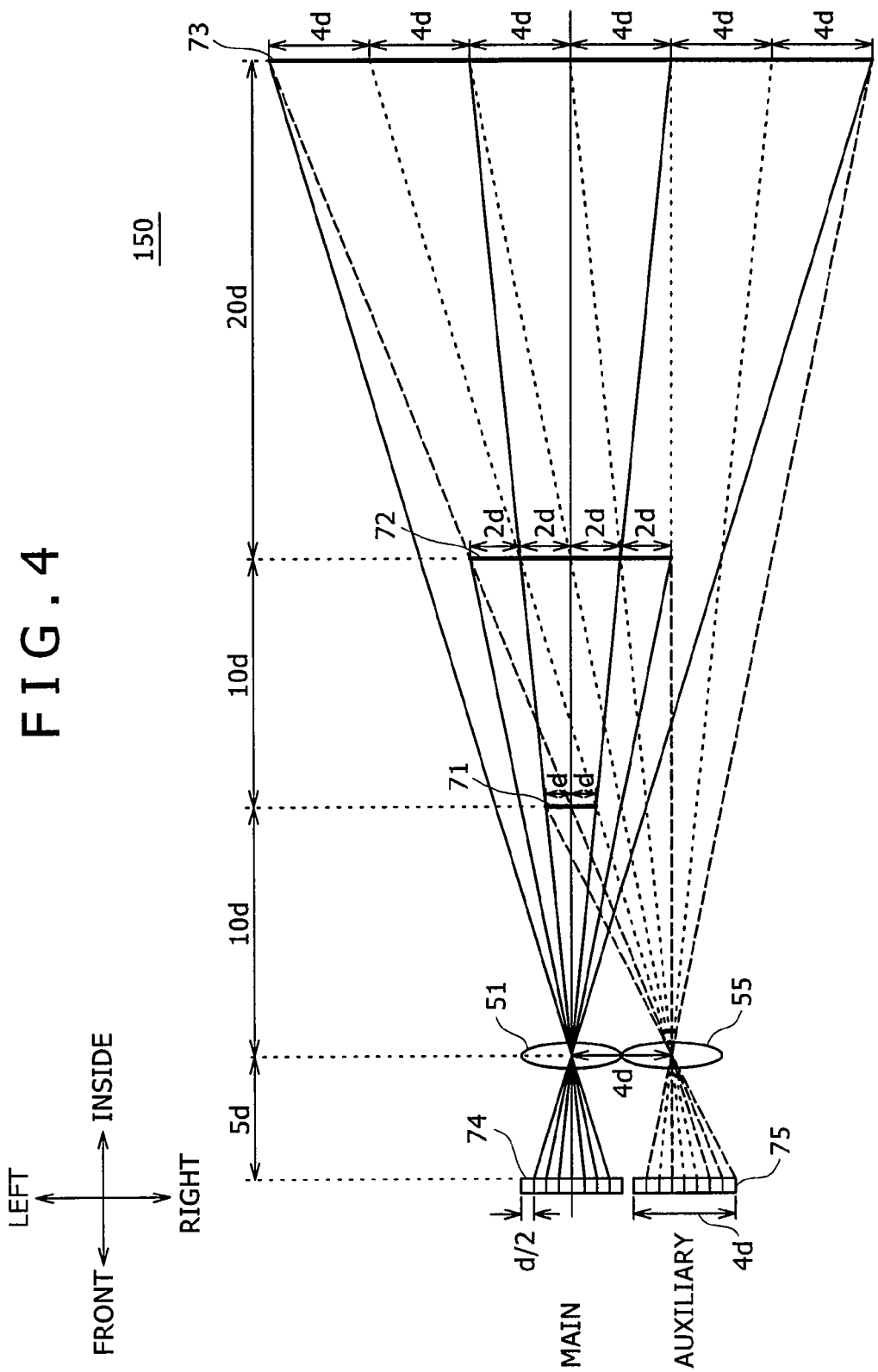
FIG. 4 is a diagram showing a top view of the parallax-detection image-taking system shown in FIG. 3A.

FIGS. 3A to 3C are a diagram showing the configuration of a parallax-extraction image-taking system 100 for displaying a 3D (three-dimensional) image. FIG. 4 is a diagram showing a top view of the parallax-extraction image-taking system 100 as a coordinate recognition model of a parallax extraction process and an image-taking process. The following description explains a process to compare image data generated by a main imager 74 with image data generated by an auxiliary imager 75 in the horizontal direction, a process to extract a parallax of image data and a process to assign a parallax/distance coefficient to the image data.

The following description explains a configuration in which a signal generated by a horizontal register employed in the main imager 74 and a signal generated by the corresponding horizontal register employed in the auxiliary imager 75 are compared with each other for every pair of a horizontal register and a corresponding horizontal register for all pairs. As for the image-taking system itself, however, the configuration does not have to be that shown in FIGS. 1A and 1B or FIGS. 2A and 2B.

In addition, setting of dimensions is by no means limited to setting at values shown in FIGS. 3A to 3C and FIG. 4. For the sake of explanation convenience, however, that shown in FIG. 3A is taken as the setting of dimensions. As shown in FIG. 3A, the distance between a lens 51 and a lens 55 is 4d; whereas the distance between the lens pair consisting of the lens 51 and the lens 55 and the imager pair consisting of the main imager 74 and the auxiliary imager 75 is 5d. The distance between the lens 51 and a first photographing object 71 is 10d; the distance between the lens 51 and a second photographing object 72 is 20d; and the distance between the lens 51 and a third photographing object 73 is 40d.

The first photographing object 71 is a rectangular plate, which has a side of 2d and is marked with the capitals X, Y, Z and W. The second photographing object 72 is also a rectangular plate, which has a side of 8d and is marked notations ι1 to μ1. The third photographing object 73 is also a rectangular plate, which has a side of 24d and is marked with symbols α1 to θ1. In this case, the character "d" denotes any arbitrary distance unit and is not limited to a specific value.

An image of an object of photographing is created by the lens 51 or 55 on one of the third photographing object 73 and the main imager 74 respectively, which each have dimensions of 4d×3d. The image created by the lens 55 or 51 on the auxiliary imager 75 or the main imager 74 respectively has matrix elements arranged in an order opposite to the order of the arrangement of the same elements in the object of photographing. Thus, an image created by the lens 51 on the main imager 74 as overlapping images of the first photographing object 71, the second photographing object 72 and the third photographing object 73 is shown in FIG. 3B. On the other hand, an image created by the lens 55 on the auxiliary imager 75 as overlapping images of the first photographing object 71, the second photographing object 72 and the third photographing object 73 is shown in FIG. 3C. However, the matrix elements themselves, which are the capitals X, Y, Z and W, the notations ι1 to μ1 and the symbols α1 to θ1, are deliberately rotated by 180 degrees to prevent the matrix elements from being shown as upside-down elements in order to make the capitals, the notations and the symbols easy to recognize.

The created overlapping images are shown in FIGS. 3B and 3C, being placed on a column-row coordinate system. The created images are each an 8-column×6-row matrix with each column having a width of d/2 and each row having a height of d/2. In the column-row coordinate system, the columns are columns 1 to 9 whereas the rows are rows A to F. The horizontal-direction shift of the image created on the auxiliary imager 75 as the image of the first photographing object 71 which locates near the lens 55 is largest among the horizontal-direction shifts of the images created on the auxiliary imager 75. On the other hand, the horizontal-direction shift of the image created on the auxiliary imager 75 as the image of the third photographing object 73 which locates far from the lens 55 is smallest among the horizontal-direction shifts of the images created on the auxiliary imager 75.

In particular, on the main imager 74 shown in the coordinate recognition diagram of FIG. 3B, the image of the third photographing object 73 is created on coordinate blocks starting with the coordinate blocks A2 to A7 of the first row and ending with the coordinate blocks F2 to F7 of the last row. For example, on the coordinate blocks A2 to A7 of the first row, the image of the third photographing object 73 is created as symbols θ1 to η1 respectively, on the subsequent rows, the image of the third photographing object 73 is created in the same way as the first row and, on the coordinate blocks F2 to F7 of the last row, the image of the third photographing object 73 is created as symbols β1 to α1 respectively. By the same token, the image of the second photographing object 72 is created as an overlapping image on coordinate blocks starting with the coordinate blocks B3 to B6 of the first row and ending with the coordinate blocks E3 to E6 of the last row. For example, on the coordinate blocks B3 to B6, the image of the second photographing object 72 is created as notations μ1 to λ3 respectively, on the subsequent rows, the image of the second photographing object 72 is created in the same way as the first row and, on the coordinate blocks E3 to E6, the image of the second photographing object 72 is created as notations ι4 to ι1 respectively. Likewise, the image of the first photographing object 71 is created as an overlapping image on coordinate blocks starting with the coordinate blocks C4 and C5 of the first row and ending with the coordinate blocks D4 and D5 of the last row. For example, on the coordinate blocks C4 and C5, the image of the first photographing object 71 is created as the capitals W and Z respectively and, on the coordinate blocks D4 and D5, the image of the first photographing object 71 is created as the capitals Y and X respectively. The image created on the main imager 74 shown in FIG. 3B as the image of the third photographing object 73 is obtained by rotating the symbol matrix of the uppermost plate shown in FIG. 3A by 180 degrees due to the effect of the lens 51. By the same token, the image created on the main imager 74 shown in FIG. 3B as the image of the second photographing object 72 is obtained by rotating the notation matrix of the middle plate shown in FIG. 3A by 180 degrees due to the effect of the lens 51. In the same way, the image created on the main imager 74 shown in FIG. 3B as the image of the first photographing object 71 is obtained by rotating the capital matrix of the lowermost plate shown in FIG. 3A by 180 degrees due to the effect of the lens 51. The images shown in FIG. 3B are not shifted from their references due to distances to the objects of photographing.

The overlapping images created on the auxiliary imager 75 are shown in FIG. 3C, which is a diagram showing the same overlapping images as those shown in FIG. 3B as except that the horizontal coordinates blocks of the coordinate system shown in FIG. 3C each have an offset of +1 with respect to the coordinate system shown in FIG. 3B.

In particular, on the auxiliary imager 75 shown in the coordinate recognition diagram of FIG. 3C, the image of the third photographing object 73 is created on coordinate blocks starting with the coordinate blocks A3 to A8 of the first row and ending with the coordinate blocks F3 to F8 of the last row. For example, on the coordinate blocks A3 to A8 of the first row, the image of the third photographing object 73 is created as symbols θ1 to η1 respectively, on the subsequent rows, the image of the third photographing object 73 is created in the same way as the first row and, on the coordinate blocks F3 to F8 of the last row, the image of the third photographing object 73 is created as symbols β1 to α1 respectively. By the same token, the image of the second photographing object 72 is created as an overlapping image on coordinate blocks starting with the coordinate blocks B5 to B8 of the first row and ending with the coordinate blocks E5 to E8 of the last row. For example, on the coordinate blocks B5 to B8, the image of the second photographing object 72 is created as notations μ1 to λ3 respectively, on the subsequent rows, the image of the second photographing object 72 is created in the same way as the first row and, on the coordinate blocks E5 to E8, the image of the second photographing object 72 is created as notations ι4 to ι1 respectively. Likewise, the image of the first photographing object 71 is created as an overlapping image on coordinate blocks starting with the coordinate blocks C8 and C9 of the first row and ending with the coordinate blocks D8 and D9 of the last row. For example, on the coordinate blocks C8 and C9, the image of the first photographing object 71 is created as the capitals W and Z respectively and, on the coordinate blocks D8 and D9, the image of the first photographing object 71 is created as the capitals Y and X respectively. The image created on the auxiliary imager 75 shown in FIG. 3C as the image of the third photographing object 73 is obtained by rotating the symbol matrix of the uppermost plate shown in FIG. 3A by 180 degrees due to the effect of the lens 55 in the same way as the image created on the main imager 74 shown in FIG. 3B as the image of the third photographing object 73 is obtained by rotating the symbol matrix of the uppermost plate shown in FIG. 3A by 180 degrees due to the effect of the lens 51. By the same token, the image created on the auxiliary imager 75 shown in FIG. 3C as the image of the second photographing object 72 is obtained by rotating the notation matrix of the middle plate shown in FIG. 3A by 180 degrees due to the effect of the lens 55. In the same way, the image created on the auxiliary imager 75 shown in FIG. 3C as the image of the first photographing object 71 is obtained by rotating the capital matrix of the lowermost plate shown in FIG. 3A by 180 degrees due to the effect of the lens 55. In addition, the images shown in FIG. 3C as the images created on the auxiliary imager 75 are shifted from their positions in the coordinate system shown in FIG. 3B because of parallaxes also due to the fact that the horizontal coordinates blocks of the coordinate system shown in FIG. 3C each have an offset of +1 with respect to the coordinate system shown in FIG. 3B.

It is to be noted that, by taking a very small coordinate block unit, the precision of the recognition of a parallax can be improved. Thus, it is desirable to take the pixel as a coordinate block unit.

FIG. 4 is a diagram showing a top view 150 of the parallax-extraction image-taking system 100. The same dimensions as those taken in FIG. 3 are used in FIG. 4.

In the top view 150, image creation lines for creating the image of an object of photographing on the main imager 74 through the lens 51 are each drawn as a solid line whereas image creation lines for creating the image of an object of photographing on the auxiliary imager 75 through the lens 55 are each drawn as a broken line.

The center line of the main imager 74 is set as a line passing through the centers of the first photographing object 71, the second photographing object 72 and the third photographing object 73. The center of the auxiliary imager 75 is separated away in the horizontal direction from the center of the main imager 74 by a distance of 4d. Thus, the centers of the first photographing object 71, the second photographing object 72 and the third photographing object 73 are shifted from the center line of the auxiliary imager 75 and the lens 55 by the distance of 4d. The position of an image created on the auxiliary imager 75 as the image of an object of photographing is shifted from the position of an image created on the main imager 74 as the image of the same object of photographing. The closer the distance from the lens 55 to the object of photographing, the larger the positional shift of the image of the object of photographing.

That is to say, as is also obvious from the top view 150, on the auxiliary imager 75 shown in FIG. 3C, the position of the image of the first photographing object 71 is shifted to the right from the image position on the main imager 74 shown in FIG. 3B. In addition, the first photographing object 71 is shifted more to the right from the center line of the auxiliary imager 75 and the lens 55 in comparison with the second photographing object 72 and the third photographing object 73.

Figure 5:
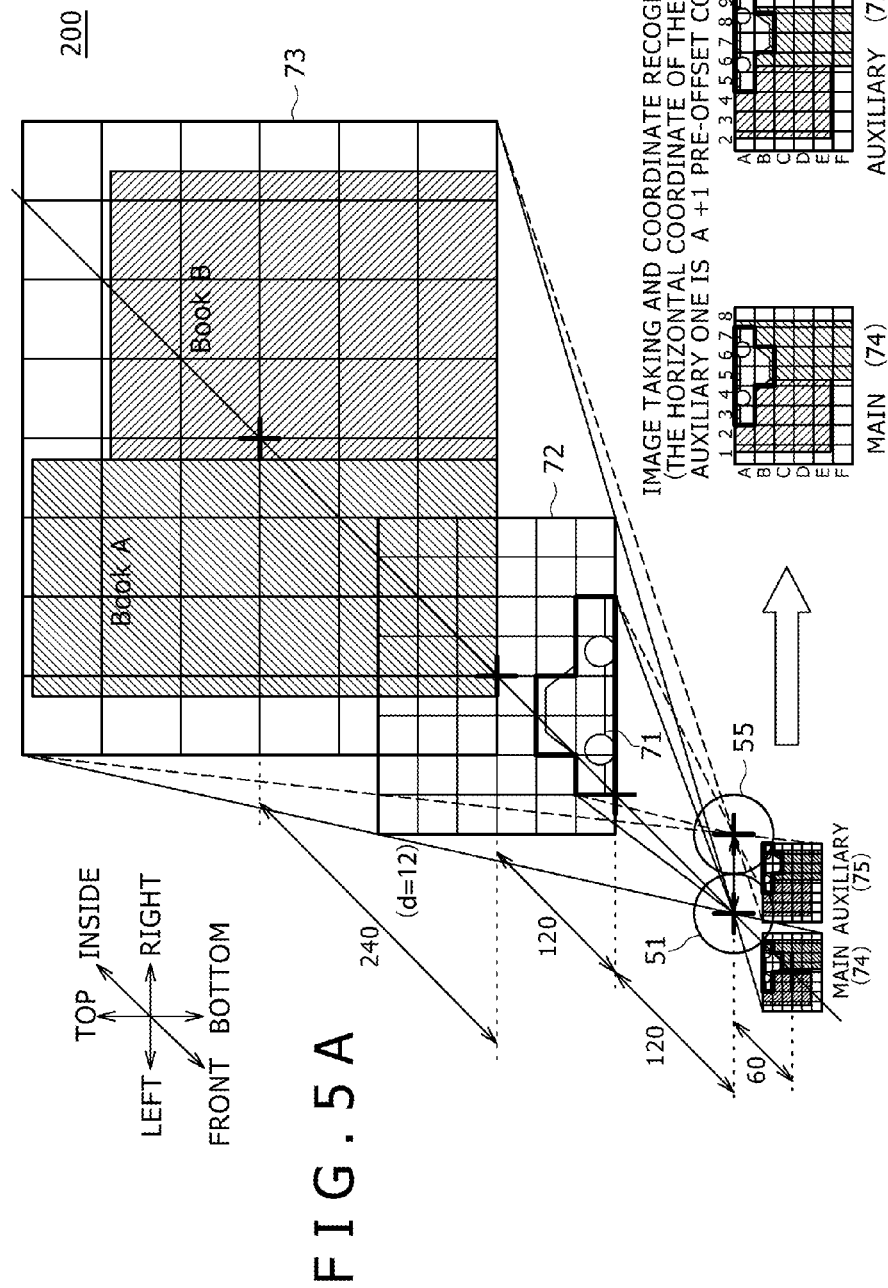
FIG. 5A is a diagram showing the configuration of a typical parallax-detection image-taking system.
FIGS. 5B and 5C are diagrams showing an image respectively created on main and auxiliary imagers employed in the typical parallax-detection image-taking system.

FIG. 5 is a diagram showing a first typical implementation of a parallax-extraction image-taking coordinate-recognition system 200 according to an embodiment.

While FIG. 3 is referred to in the description of the principle of photographing, FIG. 5A is a diagram of the typical implementation of the principle. In FIG. 5A, the block unit d is set at 12 mm. Reference numeral 71 denotes a mini car serving as a front scene separated away from the lens 51 by a distance of 240 mm. Reference numeral 73 denotes two books A and B, which serve as a rear scene (or a background) separated away from the lens 51 by a distance of 480 mm. The two books A and B are each shown in the figure as a hatched block.

In the block coordinate system consisting of columns 1 to 8 and rows A to F, the image of the mini car 71 is shown as a figure enclosed by a solid line whereas the image of the A and B books 73 serving as the background is shown as hatched blocks.

On the main imager 74 shown in FIG. 5B, the image of the mini car 71 occupies an area of coordinate blocks A3 to A7 and B5 to B6. On the auxiliary imager 75 shown in FIG. 5C, on the other hand, the image of the mini car 71 occupies an area of coordinate blocks A5 to A9 and B7 to B8. Thus, the image created on the auxiliary imager 75 as the image of the mini car 71 is shifted to the right side in the block coordinate system rotated by 180 degrees from the image created on the main imager 74 shown in FIG. 5B as the image of the mini car 71 by two blocks including the +1 pre-offset. In this way, the shift of the image created on the auxiliary imager 75 as the image of the mini car 71 from the image created on the main imager 74 as the image of the mini car 71 in the horizontal direction on the block coordinate system is recognized. On the other hand, the image created on the auxiliary imager 75 as the image of the A and B books 73 serving as the background is slightly shifted in the right direction from the image created on the main imager 74 as the image of the A and B books 73 by a distance of about one block including even the +1 pre-offset. Thus, the shift of the image of the A and B books 73 is smaller than the shift of the image of the mini car 71.

Figure 6:
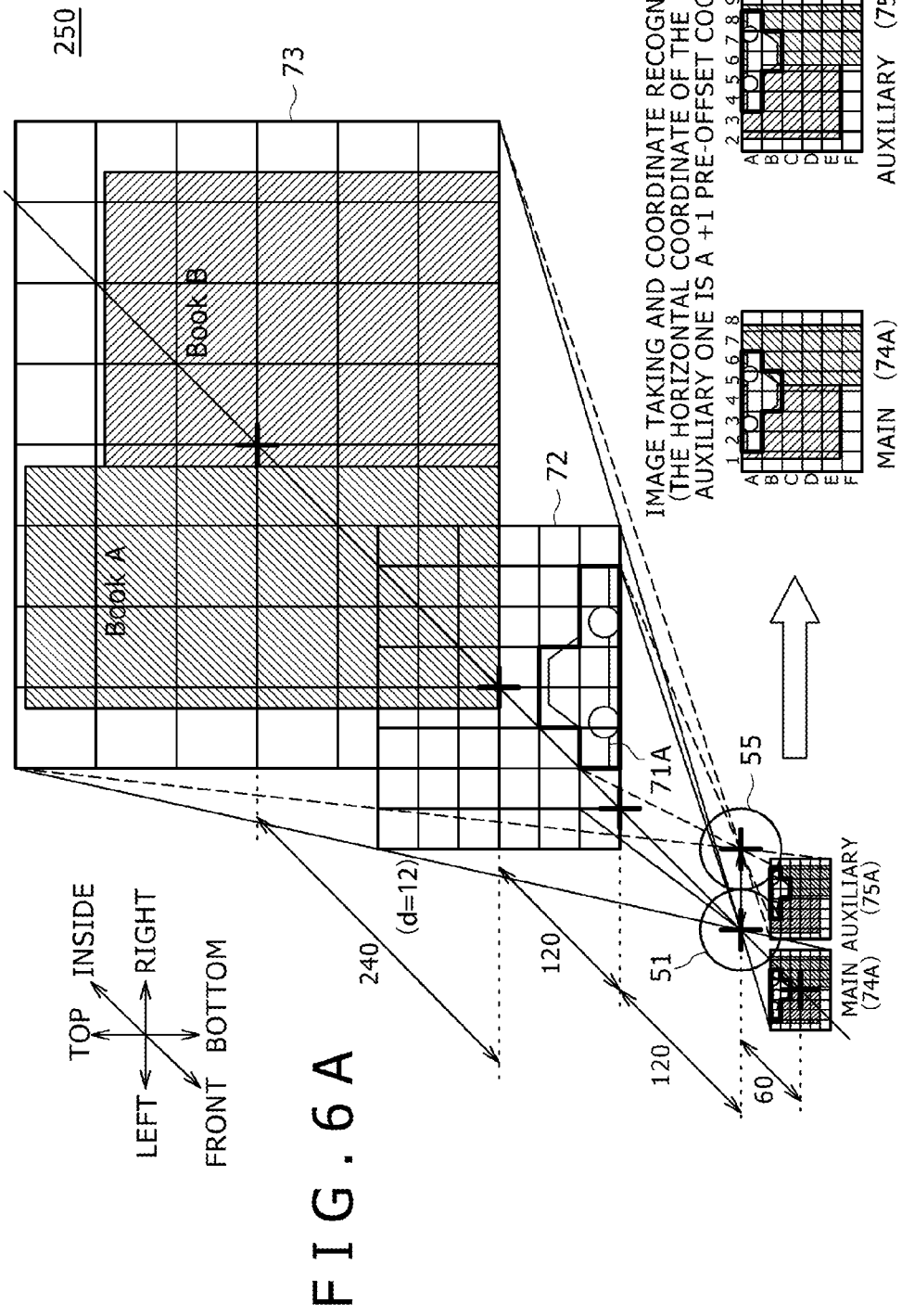
FIG. 6A is a diagram showing the configuration of another typical parallax-detection image-taking system.
FIGS. 6B and 6C are diagrams showing an image respectively created on main and auxiliary imagers employed in the other typical parallax-detection image-taking system.

FIG. 6 is a diagram showing a second typical implementation of a parallax-extraction image-taking coordinate-recognition system 250 according to the embodiment of the present invention. In the second implementation shown in FIG. 6A, the mini car 71 has slightly moved in the horizontal direction.

On the main imager 74A shown in FIG. 6B, the image of the mini car 71 occupies an area of coordinate blocks A2 to A6 and B4 to B5. On the auxiliary imager 75 shown in FIG. 6C, on the other hand, the image of the mini car 71 occupies an area of coordinate blocks A4 to A8 and B6 to B7. Thus, the image created on the auxiliary imager 75 as the image of the mini car 71 is shifted to the right side in the block coordinate system from the image created on the main imager 74 shown in FIG. 6B as the image of the mini car 71 by two blocks. On the other hand, the image created on the auxiliary imager 75 as the image of the A and B books 73 serving as the background is slightly shifted in the right direction from the image created on the main imager 74 as the image of the A and B books 73 by a distance of about one block.

Figure 7:
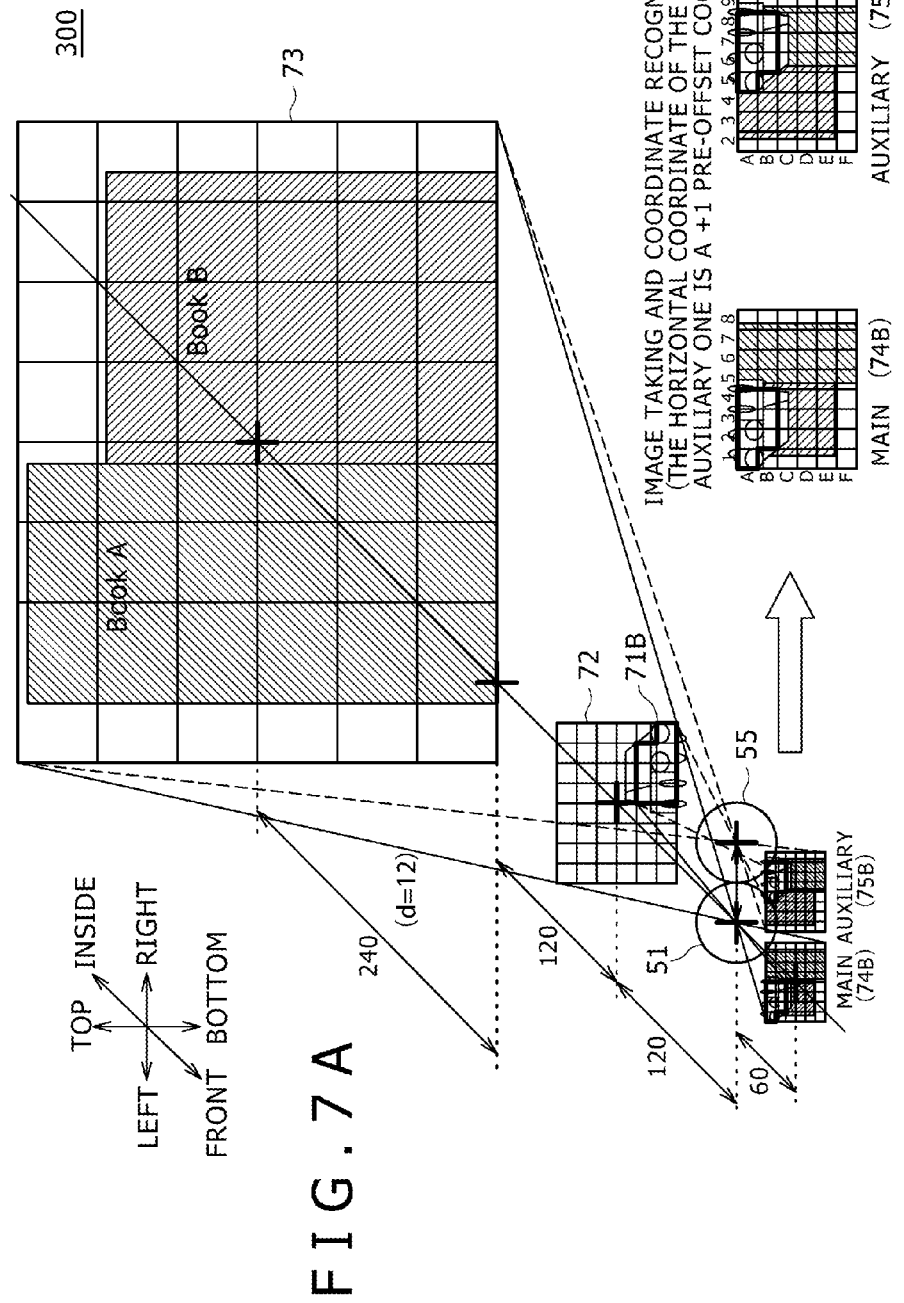
FIG. 7A is a diagram showing the configuration of a further typical parallax-detection image-taking system.
FIGS. 7B and 7C are diagrams showing an image respectively created on main and auxiliary imagers employed in the further typical parallax-detection image-taking system.

FIG. 7 is a diagram showing a third typical implementation of a parallax-extraction image-taking coordinate-recognition system 300 according to the embodiment. In the third implementation shown in FIG. 7A, the mini car 71 has further moved along an abruptly curved road approaching the lens 51 and reached a position separated from the lens 51 by a distance of 120 mm.

On the main imager 74B shown in FIG. 7B, the image of the mini car 71 occupies an area of coordinate blocks A1 to A4 and B2 to B4. On the auxiliary imager 75B shown in FIG. 7C, on the other hand, the image of the mini car 71 occupies an area of coordinate blocks A5 to A8 and B6 to B8. Thus, the images created on the auxiliary imager 75B as the images of the mini car 71 and the A and B books 73 are shifted to the right side from the coordinate blocks A1 to A4 and B2 to B4 occupied by the images created on the main imager 74 shown in FIG. 7B as the images of the mini car 71 and the A and B books 73 by four blocks including the +1 pre-offset. If FIGS. 7B and 7C are compared with FIGS. 5B and 5C respectively of FIGS. 6B and 6C respectively, it will become obvious that, as the mini car 71 serving as the front scene approaches the lenses 51 and 55, the horizontal-direction block shift between the image created on the main imager 74A or 75A as the image of the mini car 71 and the image created on the main imager 74B or 75B as the image of the mini car 71 increases.

Figure 8:
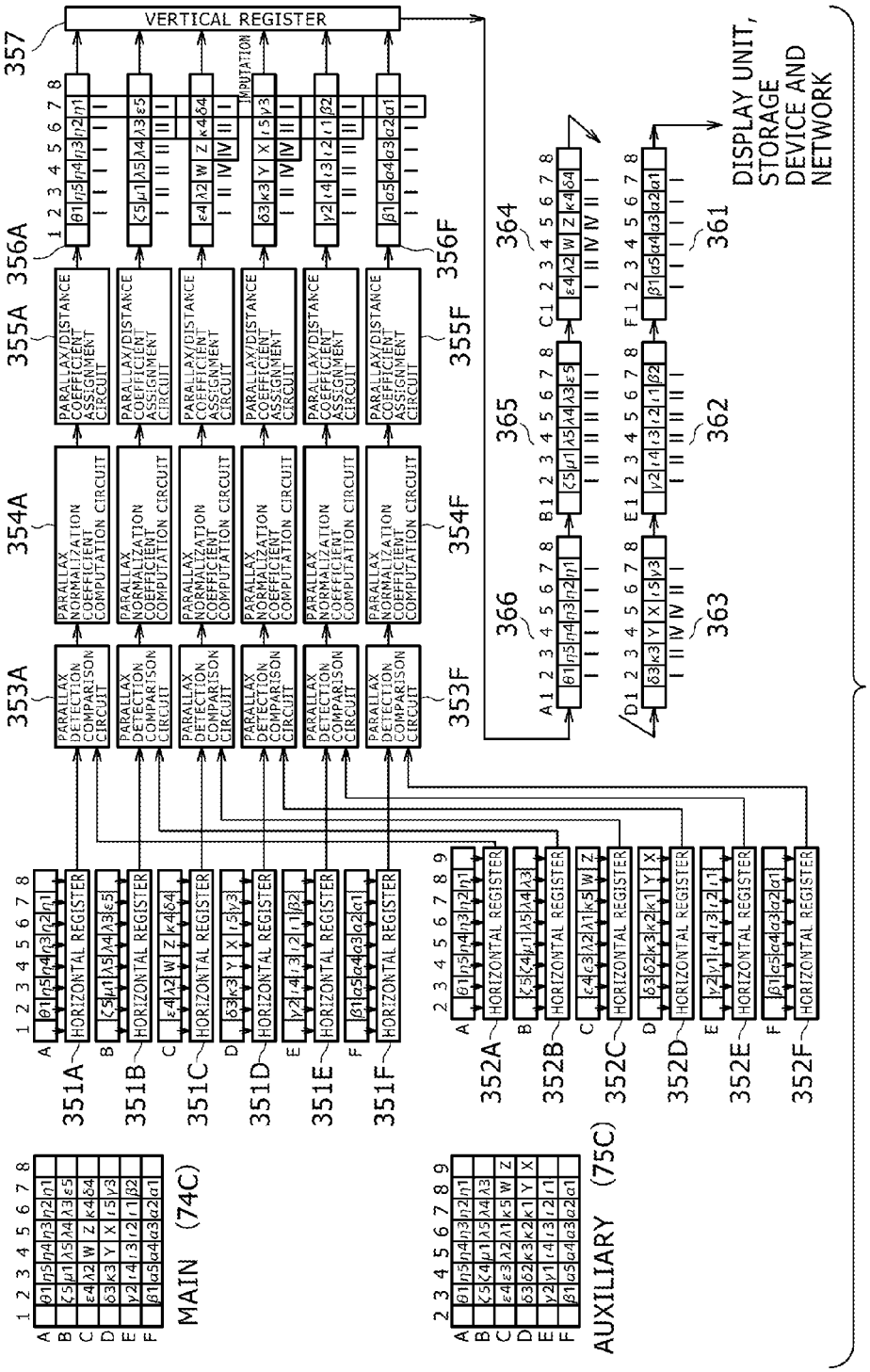
FIG. 8 is a diagram showing a typical concrete configuration of an LSI chip integrating main and auxiliary imagers.

FIG. 8 is a diagram showing a typical concrete configuration of an LSI chip 350 including a main imager 74C, an auxiliary imager 75C and an image processing circuit, which are shown in FIG. 2. The LSI chip 350 is denoted by reference numeral 54 in FIG. 2. The image processing circuit includes horizontal registers 351A to 351F provided for the main imager 74C, horizontal registers 352A to 352F provided for the auxiliary imager 75C, parallax detection comparison circuits 353A to 353F, parallax normalization coefficient computation circuits 354A to 354F, parallax/distance coefficient assignment circuits 355A to 355F, registers 356A to 356F, a vertical register 357 and registers 361 to 366.

Pieces of image data represented by symbols θ1, η5, η4, η3, η2 and η1 at coordinate blocks A2 to A7 of the main imager 74C are transferred to the horizontal register 351A. By the same token, pieces of image data represented by symbols ζ5, μ1, λ5, λ4, λ3 and ε5 at coordinate blocks B2 to B7 of the main imager 74C are transferred to the horizontal register 351B. In the same way, pieces of image data on the subsequent rows of coordinate blocks of the main imager 74C are transferred to the subsequent horizontal registers. Likewise, pieces of image data represented by symbols β1, α5, α4, α3, α2 and α1 at coordinate blocks F2 to F7 of the main imager 74C are transferred to the horizontal register 351F.

Similarly, pieces of image data are transferred from rows of blocks on the auxiliary imager 75C to the horizontal registers 352A to 352F corresponding to the block rows.

The parallax detection comparison circuits 353A to 353F, the parallax normalization coefficient computation circuits 354A to 354F and the parallax/distance coefficient assignment circuits 355A to 355F compose a system for carrying out parallel processing such as parallax extraction and parallax/distance coefficient assignment processes.

The parallax detection comparison circuits 353A to 353F receive the pieces of image data from the horizontal registers 351A to 351F of the main imager 74C and the pieces of image data from the horizontal registers 352A to 352F of the auxiliary imager 75C, comparing the pieces of data received from the main imager 74C and the pieces of data received from the auxiliary imager 75C with each other in order to detect a parallax for each coordinate block.

For example, the image data represented by symbol ε4 at coordinate block C2 of the main imager 74C is located at coordinate block C3 of the auxiliary imager 75C, causing a parallax to be detected as a block shift of I. By the same token, the image data represented by notation λ2 at coordinate block C3 of the main imager 74C is located at coordinate block C5 of the auxiliary imager 75C, causing a parallax to be detected as a block shift of II. In the same way, the image data represented by the capital W at coordinate block C4 of the main imager 74C is located at coordinate block C8 of the auxiliary imager 75C, causing a parallax to be detected as a block shift of IV. Likewise, the image data represented by the capital Z at coordinate block C5 of the main imager 74C is located at coordinate block C9 of the auxiliary imager 75C, causing a parallax to be detected as a block shift of IV. Similarly, the image data represented by notation κ4 at coordinate block C6 of the main imager 74C is located at coordinate block C10 (not shown in the figure) of the auxiliary imager 75C, causing a parallax to be detected as a block shift of II. By the same token, the image data represented by symbol δ4 at coordinate block C7 of the main imager 74C is located at coordinate block C11 (not shown in the figure) of the auxiliary imager 75C, causing a parallax to be detected as a block shift of I.

The above description holds true for the other horizontal registers 351A and 352A corresponding to coordinate blocks A1 to A8, the other horizontal registers 351B and 352B corresponding to coordinate blocks B1 to B8, the other horizontal registers 351D and 352D corresponding to coordinate blocks D1 to D8, the other horizontal registers 351E and 352E corresponding to coordinate blocks E1 to E8 and the other horizontal registers 351F and 352F corresponding to coordinate blocks F1 to F8. That is to say, pieces of image data arranged on the main imager 74C in the horizontal direction are compared with the pieces of image data arranged on the auxiliary imager 75C in the horizontal direction in order to detect parallaxes each indicated by a block shift.

The parallax normalization coefficient computation circuits 354A to 354F each carry out a normalization process to find a normalized parallax/distance coefficient for a parallax detected by the parallax detection comparison circuits 353A to 353F respectively as block shifts. To put it concretely, for example, the distance from the main imager 74C or the auxiliary imager 75C to the rear scene is normalized to 1. In this case, a parallax/distance coefficient found from a parallax detected by the parallax detection comparison circuit 353 for a photographing object serving as a front scene is equal to a fraction, which would be obtained as a result of dividing the actual distance from the main imager 74C or the auxiliary imager 75C to the object of photographing by the distance from the main imager 74C or the auxiliary imager 75C to the rear scene. As an alternative, the position of a rear scene is reversely taken as a reference of 0 and the distance from the rear scene to the lens 51 or 55 is normalized to 1. In this case, a parallax/distance coefficient found from a parallax detected by the parallax detection comparison circuit 353 for a photographing object serving as a front scene is equal to a fraction, which would be obtained as a result of dividing the actual distance from the rear scene to the object of photographing by the distance from the rear scene to the lens 51 or 55.

A detected parallax is thus represented by a normalized parallax/distance coefficient, which is equal to a fraction, which would be obtained as a result of dividing the actual distance from a reference to an object of photographing by a distance normalized to 1 as described above. Then, the normalized parallax/distance coefficient found from a parallax detected by the parallax detection comparison circuit 353 is normalized again into another value as described below and assigned to a coordinate block corresponding to the object of photographing as a final parallax/distance coefficient.

The parallax/distance coefficient assignment circuits 355A to 355F each further carry out additional processing on the normalized parallax/distance coefficient coefficients output by the parallax normalization coefficient computation circuits 354A to 354F respectively. For example, in the case of a normalized parallax/distance coefficient normally not greater than 1, the normalized parallax/distance coefficient is multiplied by a value to result in a product, which is then typically rounded to produce an integer to be assigned as a final parallax/distance coefficient to the corresponding block. By using the final parallax/distance coefficient, digital processes of the subsequent processes become easy to carry out. It is needless to say that, in place of an integer, another value or a code can also be used as the parallax/distance coefficient.

As another alternative, the aforementioned block shifts of I, II and IV each detected by the parallax detection comparison circuits 353A to 353F as a value inversely proportional to the distance to an object of photographing can each be assigned to a corresponding block of the main imager 74C as a parallax/distance coefficient as it is. Alternatively, the parallax/distance coefficient can be normalized and assigned to the corresponding block as a coefficient proportional to the distance.

In the embodiment shown in the figure, the block shifts of I, II and IV are assigned to their respective corresponding blocks as they are and the vertical register 357 outputs a serial image signal including attached parallax/distance coefficients.

For the sake of convenience, parallax/distance coefficients are shown under each of the registers 356A to 356F. The parallax/distance coefficients each represent a relation between image data of the main imager 74C and the corresponding image data of the auxiliary imager 75C. In actuality, the parallax/distance coefficients each representing a block shift are stored in memories associated with the registers 356A to 356F. However, the storage method and the storage means are not limited to what is described here.

The parallax/distance coefficient assignment circuits 355A to 355F supply pieces of image data and parallax/distance coefficients assigned to them to the registers 356A to 356F respectively.

For example, the image data $\theta 1$ is stored in sub-register 2 of the register 356A and the image data $\eta 5$ is stored in sub-register 3 of the register 356A. By the same token, the subsequent pieces of image data are stored in their respective subsequent sub-registers of the register 356A and the last image data $\eta 1$ is stored in sub-register 7 of the register 356A. In addition, the parallax/distance coefficients of I, I, - - - and I each representing a block shift are stored in a memory by being associated with their respective pieces of image data stored in sub-registers 2 to 7 of the register 356A.

By the same token, pieces of image data are stored in the register 346B and the parallax/distance coefficients assigned to the pieces of image data are stored in a memory associated with the register 356B. Then, the image data $\epsilon 4$ is stored in sub-register 2 of the register 356C, the image data $\lambda 2$ is stored in sub-register 3 of the register 356C, the image data W is stored in sub-register 4 of the register 356C, the image data Z is stored in sub-register 5 of the register 356C, the image data $\kappa 4$ is stored in sub-register 6 of the register 356C and the image data 64 is stored in sub-register 7 of the register 356C. In addition, the parallax/distance coefficients of I, II, IV, IV, II and I each representing a block shift are stored in a memory by being associated with their respective pieces of image data stored in sub-registers 2 to 7 of the register 356C. The process to store pieces of image data and their parallax/distance coefficients is repeated till pieces of image data and their parallax/distance coefficients are stored respectively in the register 356F and a memory associated with the register 356F.

The embodiment shown in FIG. 8 includes only few pixels. For example, the auxiliary imager 75C does not include pixels corresponding to coordinate blocks C10 and C11 associated with respectively sub-registers 6 and 7 of the register 356C and does not include pixels corresponding to coordinate blocks D10 and D11 associated with respectively sub-registers 6 and 7 of the register 356D. For this reason, sub-registers 6 and 7 of the register 356C are complementarily associated with the parallax/distance coefficients of II and I respectively and, by the same token, sub-registers 6 and 7 of the register 356D are also complementarily associated with the parallax/distance coefficients of II and I respectively.

The pieces of image data stored in the registers 356A to 356F are supplied to the vertical register 357 and then serially transferred to the registers 361 to 366 before being output to image-data recipients such as a display unit, a storage device and a network.

Figure 9:
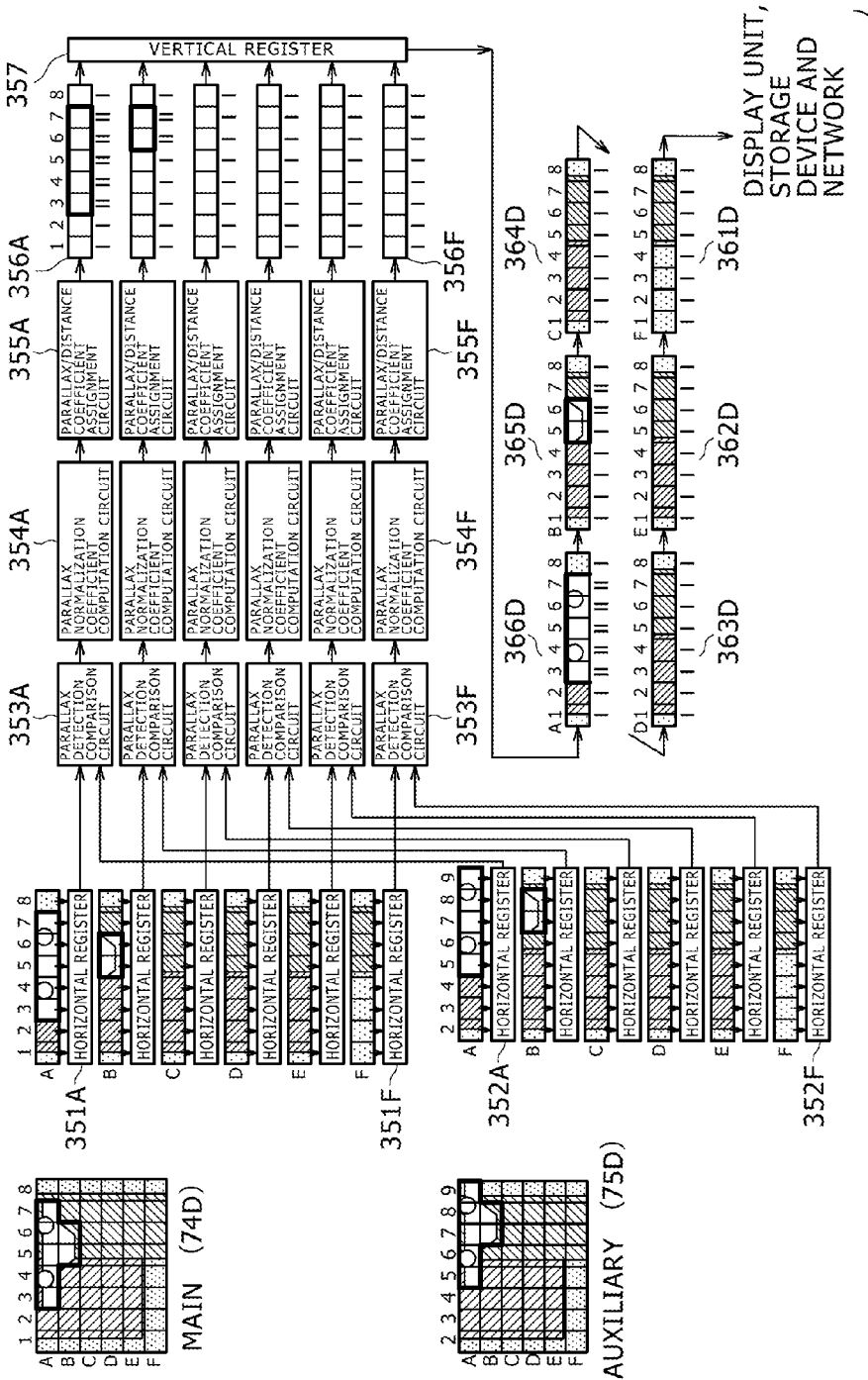
FIG. 9 is a diagram showing typical parallel processing to extract parallaxes from image data and assign parallax/distance coefficients found from the parallaxes to the image data.
Figure 10:
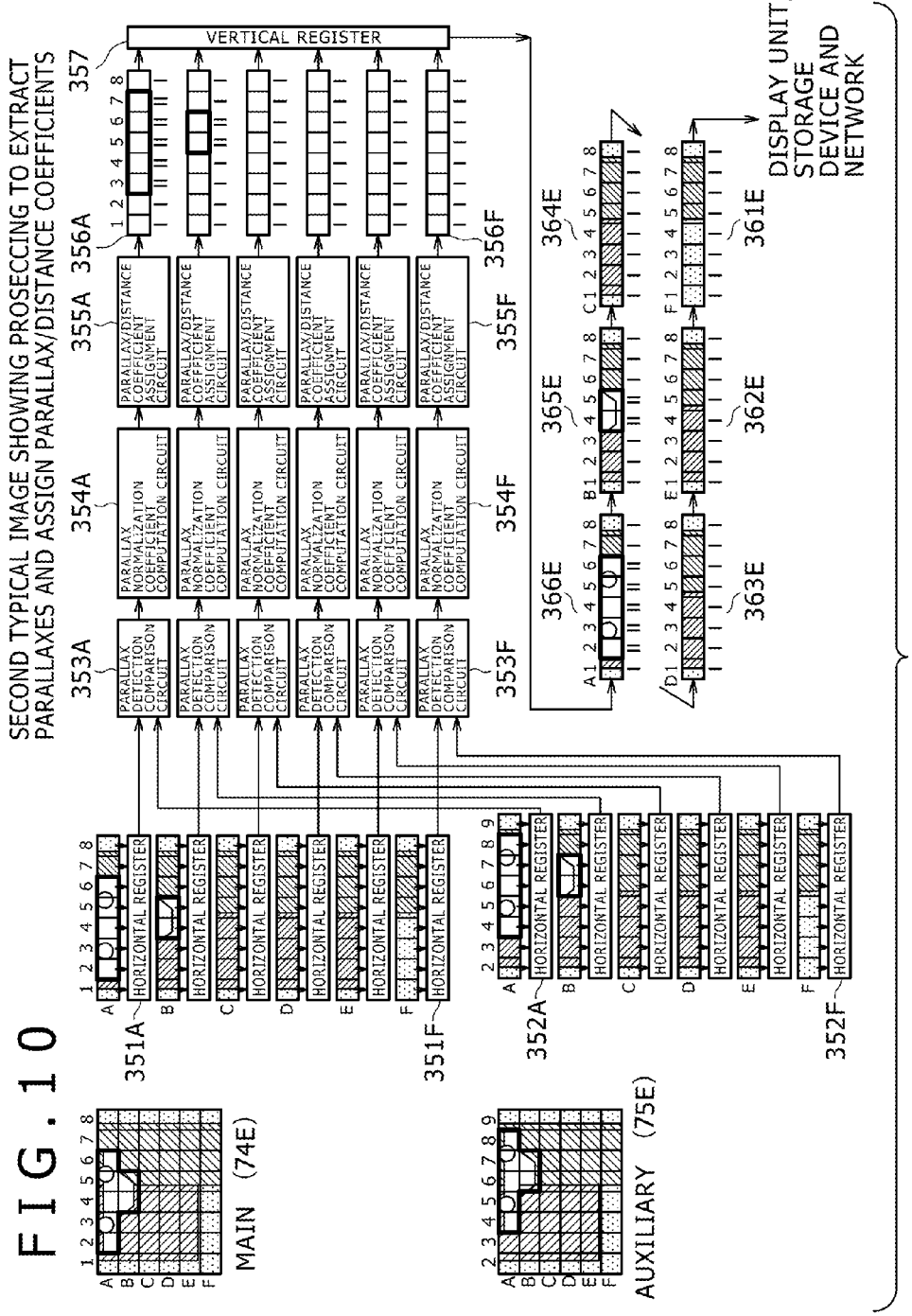
FIG. 10 is a diagram showing other typical parallel processing to extract parallaxes from image data and assign parallax/distance coefficients found from the parallaxes to the image data.

FIGS. 9, 10 and 11 are diagrams respectively showing first, second and third embodiments each implementing parallel processing of the parallax extraction and parallax/distance coefficient assignment processes described above. In particular, the first embodiment shown in FIG. 9 is an embodiment of a process to assign parallax/distance coefficients to image data obtained as a result of the image-taking operation shown in FIG. 5 by adoption of the principle explained earlier by referring to FIG. 8. In this embodiment, the parallax/distance coefficient of II is assigned to the mini car serving as the front scene whereas the parallax/distance coefficient of I is assigned to the two books and a screen, which serves as a background.

In coordinates blocks A1 to A8 and B1 to B8 of the main imager 74D, pieces of image data of the two books, the background and the mini car exist as a result of an image-taking process. To be more specific, the pieces of image data existing in the coordinate blocks A1 and A2 are data of the books and the background, the pieces of image data existing in the coordinate blocks A3 to A7 are data of the mini car whereas the piece of image data existing in the coordinate block A8 is data of a portion of the books and the background. On the other hand, the pieces of image data existing in the coordinate blocks B1 to B4 are data of the books and the background, the pieces of image data existing in the coordinate blocks B5 and B6 are data of the mini car whereas the pieces of image data existing in the coordinate blocks B7 and B8 are data of the books and the background. In all the remaining coordinates blocks C1 to C8, D1 to D8, E1 to E8 and F1 to F8 of the main imager 74D and all the horizontal registers associated with the remaining coordinates blocks, pieces of image data of the two books and the background exist as a result of the image-taking process.

On the other hand, since the books hardly move, the image data resulting from the image-taking process on the main imager 74D as the image data of the books is shifted on the auxiliary imager 75D by a distance not exceeding one block provided that the +1 pre-offset is not taken into consideration.

Since the mini car moves, however, the image data resulting from the image-taking process on the main imager 74D as the image data the mini car is shifted on the auxiliary imager 75D by a distance of one block provided that the +1 pre-offset is not taken into consideration or a distance not exceeding two blocks provided that the +1 pre-offset is taken into consideration.

To be more specific, the pieces of image data existing in the coordinate blocks A2 to A4 are data of the books and the background whereas the pieces of image data existing in the coordinate blocks A5 to A9 are data of the mini car. On the other hand, the pieces of image data existing in the coordinate blocks B2 to B6 are data of the books and the background, the pieces of image data existing in the coordinate blocks B7 and B8 are data of the mini car whereas the piece of image data existing in the coordinate block B9 is data of the books and the background. In all the remaining coordinates blocks C2 to C9, D2 to D9, E2 to E9 and F2 to F9 of the auxiliary imager 75D and all the horizontal registers associated with the remaining coordinates blocks, pieces of image data of the two books and the background exist as a result of the image-taking process.

The image data stored in the horizontal register 351A of the main imager 74D and the image data stored in the horizontal register 352A of the auxiliary imager 75D are supplied to the parallax-detection comparison circuit 353A. By the same token, the pieces of image data stored in the horizontal registers 351B to 351F of the main imager 74D and the pieces of image data stored in the horizontal registers 352B to 352F of the auxiliary imager 75D are supplied to the parallax-detection comparison circuits 353B to 353F respectively. The parallax-detection comparison circuits 353A to 353F each detect image-data shifts by comparing the pieces of image data supplied from the main imager 74D with the pieces of image data supplied from the auxiliary imager 75D. Then, the parallax normalization coefficient computation circuits 354A to 354F each carry out a normalization process based on the image-data shifts to generate normalized parallax/distance coefficients. Subsequently, the parallax/distance coefficient assignment circuits 355A to 355F each assign the normalized parallax/distance coefficients output by parallax normalization coefficient computation circuits 354A to 354F to the pieces of image data supplied by the main imager 74D. In the case of this first embodiment, a parallax/distance coefficient of I is assigned to the image data of the two books and the background whereas a parallax/distance coefficient of II is assigned to the image data of the mini car. The pieces of image data supplied by the main imager 74D are stored in the registers 356A to 356F whereas the parallax/distance coefficients assigned to the pieces of image data are stored in a memory or storage unit associated with the registers 356A to 356F.

As a result, the parallax/distance coefficient of I assigned to the pieces of image data stored in sub-registers 1, 2 and 8 of the register 356A as well as the parallax/distance coefficient of II assigned to the pieces of image data stored in sub-registers 3 to 7 of the register 356A are stored in a memory or storage unit associated with the register 356A. By the same token, the parallax/distance coefficient of I assigned to the pieces of image data stored in sub-registers 1 to 4, 7 and 8 of the register 356B as well as the parallax/distance coefficient of II assigned to the pieces of image data stored in sub-registers 5 and 6 of the register 356B are stored in a memory or storage unit associated with the register 356B. In the same way, the parallax/distance coefficient of I assigned to the pieces of image data stored in all sub-registers of each of the remaining registers 356C to 356F are stored in a memory or storage unit associated with each of the registers 356C to 356F.

Finally, the pieces of image data and the parallax/distance coefficients assigned to the pieces of image data are output to image-data recipients such as a display unit, a storage device and a network.

FIG. 10 is a diagram showing the second embodiment of a process to assign parallax/distance coefficients to image data obtained as a result of the image-taking operation shown in FIG. 6. In the case of the second embodiment, the mini car moves slightly in the horizontal direction.

Since the mini car moves, the position of the mini car is shifted in a main imager 74E shown in FIG. 10 from the position of the mini car in the main imager 74D shown in FIG. 9 in the horizontal direction to the left by one block. The image is shifted in an auxiliary imager 75E from the position of the mini car in the main imager 74E in the horizontal direction to the right by one block. Since the mini car moves in the horizontal direction, the distance from the mini car to the lenses 51 and 55 changes only a little bit. Thus, changes caused by the parallax between the main imager 74E and the auxiliary imager 75E are also small as well. For this reason, the parallax/distance coefficient of II is assigned to the image data of the mini car much like the first embodiment shown in FIG. 9. On the other hand, the distance from the two books and the screen serving as the background to the lenses 51 and 55 does not change. For this reason, the parallax/distance coefficient of I is assigned to the image data of the two books and the background.

As a result, the parallax/distance coefficient of I assigned to the pieces of image data stored in sub-registers 1, 7 and 8 of the register 356A as well as the parallax/distance coefficient of II assigned to the pieces of image data stored in sub-registers 2 to 6 of the register 356A are stored in a memory or storage unit associated with the register 356A. By the same token, the parallax/distance coefficient of I assigned to the pieces of image data stored in sub-registers 1 to 3 and 6 to 8 of the register 356B as well as the parallax/distance coefficient of II assigned to the pieces of image data stored in sub-registers 4 and 5 of the register 356B are stored in a memory or storage unit associated with the register 356B. In the same way, the parallax/distance coefficient of I assigned to the pieces of image data stored in all sub-registers of each of the remaining registers 356C to 356F are stored in a memory or storage unit associated with each of the registers 356C to 356F.

Finally, the pieces of image data and the parallax/distance coefficients assigned to the pieces of image data are output to image-data recipients such as a display unit, a storage device and a network.

FIG. 11 is a diagram showing the third embodiment of a process to assign parallax/distance coefficients to image data obtained as a result of the image-taking operation shown in FIG. 7. In the case of the second embodiment, the mini car further moves in a direction approaching the lenses 51 and 55. Thus, a parallax/distance coefficient of IV is assigned to the image data of the mini car serving as a front scene. On the other hand, the parallax/distance coefficient of I is assigned to the image data of the two books and the background. The parallax/distance coefficient of IV is assigned to the image data of the mini car because the distance from the lenses 51 and 55 to the approaching mini car has changed substantially so that the parallaxes obtained as differences in image data between the main imager 74F and the auxiliary imager 75F also have become larger considerably as well. As described earlier, these parallax/distance coefficient are typically set in accordance with parallaxes caused by the distance from the lenses 51 and 55 to the object of photographing.

Pieces of image data existing in the coordinate blocks A1 to A4 of the main imager 74F as a result of an image-taking process are data of the mini car whereas pieces of image data existing in the coordinate blocks A5 to A8 of the main imager 74F as a result of the image-taking process are data of the books and the background. Pieces of image data existing in the coordinate blocks B1 and B5 to B8 of the main imager 74F as a result of the image-taking process are data of the books and the background, whereas pieces of image data existing in the coordinate blocks B2 to B4 of the main imager 74F as a result of the image-taking process are data of mini car. Pieces of image data existing in all the remaining coordinate blocks of the main imager 74F as a result of the image-taking process are data of the books and the background.

On the other hand, pieces of image data existing in the coordinate blocks A2 to A4 and A9 of the auxiliary imager 75F as a result of the image-taking process are data of the books and the background, whereas pieces of image data existing in the coordinate blocks A5 to A8 of the auxiliary imager 75F as a result of the image-taking process are data of mini car. Pieces of image data existing in the coordinate blocks B1 to B5 and B9 of the auxiliary imager 75F as a result of the image-taking process are data of the books and the background, whereas pieces of image data existing in the coordinate blocks B6 and to B8 of the auxiliary imager 75F as a result of the image-taking process are data of mini car. Pieces of image data existing in all the remaining coordinate blocks C2 to F9 of the main imager 74F as a result of the image-taking process are data of the books and the background.

The main imager 74F supplies the pieces of image data to the parallax-detection comparison circuits 353A to 353F by way of the horizontal registers 351A to 351F respectively, which are provided for the main imager 74F. By the same token, the auxiliary imager 75F supplies the pieces of image data to the parallax-detection comparison circuits 353A to 353F by way of the horizontal registers 352A to 352F respectively, which are provided for the auxiliary imager 75F. The parallax-detection comparison circuits 353A to 353F detects shifts between the pieces of image data. After the shifts between the pieces of image data are subjected to a normalization process in the parallax normalization coefficient computation circuits 354A to 354F and the parallax/distance coefficient assignment circuits 355A to 355F, parallax/distance coefficients are assigned to the normalized values in the parallax/distance coefficient assignment circuits 355A to 355F. In this embodiment, the parallax/distance coefficient of IV is assigned to the image data of the mini car serving as a front scene whereas the parallax/distance coefficient of I is assigned to the image data of the two books and the background.

As a result, the parallax/distance coefficient of IV is assigned to pieces of image data, which are then stored in sub-registers 1 to 4 of the register 356A. On the other hand, the parallax/distance coefficient of I is assigned to pieces of image data, which are then stored in sub-registers 5 to 8 of the register 356A. By the same token, the parallax/distance coefficient of I is assigned to pieces of image data, which are then stored in sub-registers 1 and 5 to 8 of the register 356B. On the other hand, the parallax/distance coefficient of IV is assigned to pieces of image data, which are then stored in sub-registers 2 to 4 of the register 356B. The parallax/distance coefficient of I is assigned to all the remaining pieces of image data, which are then stored in the remaining sub-registers, i.e., sub-registers 1 to 8 of each of the registers 356C to 356F.

Finally, the pieces of image data and the parallax/distance coefficients assigned to the pieces of image data are output to image-data recipients such as a display unit, a storage device and a network.

FIG. 12 is diagrams each showing a model of a pseudo 3D (three-dimensional) effect of a reproduced image using assigned parallax/distance coefficients. By using the parallax/distance coefficients explained with reference to FIG. 8, the ordinary 3D (three-dimensional) effect such as a both-eye 3D (three-dimensional) view can also be obtained in a reproduced image. In addition, the present invention also provides image processing to generate a 3D (three-dimensional) pseudo effect in not only both of the eyes, but also in one eye.

In this case, the pseudo effect can be obtained by using ordinary display means without requiring special display means such as a both-eye 3D (three-dimensional) viewer. The parallax/distance coefficients of I, II and IV are inversely proportional to distances of 4, 2 and 1 units respectively.

In accordance with the embodiment, image processing is carried out to alternately shift image data of each horizontal-coordinate block (or each horizontal-coordinate group) in the horizontal direction by a shift distance proportional to the positional distance from the lenses to the object of photographing generating the image data. By focusing both the eyes on the front scene, it is possible to create an effect of showing the background separated away from the front scene by a pseudo positional distance, which exists between the scenes as a distance proportional to the square of the actual positional distance between the scenes, on a reproduced image seen by each one of the eyes.

FIG. 12A is a diagram showing data of a reproduced image. The data includes parallax/distance coefficients each assigned to a piece of block image data. For example, the parallax/distance coefficient of I is assigned to pieces of block image data represented by symbols $\alpha 1$, $\alpha 2$, $\alpha 3$, $\alpha 4$, $\alpha 5$, $\beta 1$, $\beta 2$, $\gamma 2$, $\gamma 3$, $\delta 3$, $\delta 4$, $\epsilon 4$, $\epsilon 5$, $\zeta 5$, $\eta 1$, $\eta 2$, $\eta 3$, $\eta 4$, $\eta 5$ and $\theta 1$ to result in pieces of block image data represented by $\alpha 1I$, $\alpha 2I$, $\alpha 3I$, $\alpha 4I$, $\alpha 5I$, $\beta 1I$, $\beta 2I$, $\gamma 2I$, $\gamma 3I$, $\delta 3I$, $\delta 4I$, $\epsilon 4I$, $\epsilon 5I$, $\zeta 5I$, $\eta 1I$, $\eta 1I$, $\eta 2I$, $\eta 3I$, $\eta 4I$, $\eta 5I$ and $\theta 1I$ respectively, the parallax/distance coefficient of II is assigned to pieces of block image data represented by notations $\iota 1$, $\iota 2$, $\iota 3$, $\iota 4$, $\iota 5$, $\kappa 3$, $\kappa 4$, $\lambda 2$, $\lambda 3$, $\lambda 4$, $\lambda 5$ and $\mu 1$ to result in pieces of block image data represented by $\iota 1II$, $\iota 2 1II$, $\iota 3II$, $\iota 4II$, $\iota 5II$, $\kappa 3II$, $\kappa 4II$, $\lambda 2II$, $\lambda 3II$, $\lambda 4II$, $\lambda 5II$ and $\mu 1II$ respectively whereas the parallax/distance coefficient of IV is assigned to pieces of block image data represented by the capitals X, Y, Z and W to result in pieces of block image data represented by XIV, YIV, ZIV and WIV respectively. The parallax/distance coefficient each assigned to a piece of block image data is a value found on the basis of a detected parallax, and with the value, a pseudo 3D (three-dimensional) image is produced.

FIG. 12B is a diagram showing a method of processing image data to demonstrate a pseudo 3D (three-dimensional) effect. For example, the pieces of block image data each having the assigned parallax/distance of I representing a positional distance of four units as expressed by $\alpha 1I$, $\alpha 2I$, $\alpha 3I$, $\alpha 4I$, $\alpha 5I$ and $\beta 1I$ on the first row of FIG. 12A are shifted to the left by one coordinate block. The pieces of block image data each having the assigned parallax/distance of I as expressed by $\beta 2I$ and $\gamma 2I$ on the second row of FIG. 12A are shifted to the right by one coordinate block, but the pieces of block image data each having the assigned parallax/distance of II representing a positional distance of two units as expressed by $\iota 1II$, $\iota 2II$, $\iota 3II$ and $\iota 4II$ on the second row are shifted to the right by ½ coordinate blocks.

The pieces of block image data each having the assigned parallax/distance of I as expressed by $\gamma 3I$ and $\delta 3I$ on the third row of FIG. 12A are shifted to the left by one coordinate block, the pieces of block image data each having the assigned parallax/distance of II as expressed by $\iota 5II$ and $\kappa 3II$ on the third row are shifted to the left by ½ coordinate blocks whereas the pieces of block image data each having the assigned parallax/distance of IV representing a positional distance of 1 unit as expressed by XIV and YIV on the third row are shifted to the left by zero coordinate blocks.

The pieces of block image data on fourth to the sixth rows of FIG. 12A are processed in the same way by shifting each of the pieces of block image data in the right or left direction depending on the row number by a shift distance depending on the assigned parallax/distance coefficient. The series of operations carried out on the rows are carried out typically for every frame of the moving picture in image processing to produce the 3D (three-dimensional) pseudo effect even in one eye. The result of the image processing is shown in FIG. 12B.

In the embodiment described above, image data having the I parallax/distance coefficient indicating a small parallax is shifted by a long shift distance but, on the other hand, image data having the IV parallax/distance coefficient indicating a large parallax is shifted by a small shift distance. It is to be noted, however, that image data having the I parallax/distance coefficient indicating a small parallax can be reversely shifted by a short shift distance and, on the other hand, image data having the IV parallax/distance coefficient indicating a large parallax can be shifted reversely by a long shift distance.

FIG. 12C is a diagram showing an embodiment in which pieces of data are shifted in the right and left directions opposite to those of the embodiment shown in FIG. 12B. If the embodiment shown in FIG. 12B is referred to as an embodiment with a normal phase, the embodiment shown in FIG. 12C is known as an embodiment with an inverted phase. If the normal and inverted phases are introduced alternately every frame of the moving picture, the pseudo 3D (three-dimensional) effect is further enhanced. In addition to these operations, the luminance and contrast can be adjusted in accordance with the parallax/distance coefficients in order to further enhance the pseudo 3D (three-dimensional) effect.

FIGS. 13A to 13C are diagrams showing typical images reproduced as images each exhibiting a pseudo 3D (three-dimensional) effect resulting from a process to assign parallax/distance coefficients. To be more specific, FIGS. 13A, 13B, and 13C show typical images demonstrating a pseudo 3D (three-dimensional) effect produced as a result of assigning parallax/distance coefficients in the image processing explained earlier by referring respective to FIGS. 9, 10, and 11 as well as a result of adopting the principle described earlier reference to FIG. 12.

In this case, however, parallax/distance coefficients are assigned to pieces of block image data for every granularity even finer than the granularity adopted in the image processing explained earlier by referring to each of FIGS. 9, 10 and 11 as a granularity based on 8×6 coordinate blocks. That is to say, in the image processing explained earlier by referring to each of FIGS. 9, 10 and 11, the parallax/distance coefficients of I, II and IV are assigned to pieces of block image data for every 8×6 coordinate blocks. In actuality, an image may typically include 3M (3 mega=2,000×1,500) pixels. In this case, the block shifts of I, II and IV correspond to 250, 500 and 1,000 pixels respectively. In other words, the parallax/distance coefficients of I, II and IV correspond to 250, 500 and 1,000 pixels respectively, which are arranged in the horizontal direction. Thus, a block used as the unit of the parallax/distance coefficients can be reduced to give a high resolution and the parallax/distance coefficients are assigned to pieces of block image data for every much finer granularity.

FIGS. 13A to 13C are models each consisting of an upper diagram showing a typical image reproduced without a pseudo 3D (three-dimensional) effect and a lower diagram each showing a typical image reproduced with a pseudo 3D (three-dimensional) effect. The rear scene of the image is moved in line units in accordance to parallax/distance coefficients assigned to the line in order to make the mini car serving as the front scene three-dimensionally visible. This image can be displayed on an ordinary display unit requiring no special display means. In addition, since image data is processed in the image processing circuit to generate data of a pseudo 3D (three-dimensional) image as a result of the processing, the pseudo 3D (three-dimensional) image can be displayed on an ordinary display unit to allow a pseudo 3D (three-dimensional) image to be observed by either both the eyes or any one of the eyes.

As explained earlier by referring to FIGS. 9 to 11, the front scene is fixed and the rear scene serving as the background is shifted in the right or left direction in accordance with parallax/distance coefficients assigned to the rear scene in order to produce a pseudo 3D (three-dimensional) effect. It is to be noted, however that, reversely, the rear scene can also be fixed and the front scene is shifted in the right or left direction by a shift distance inversely proportional to the positional distance to the front scene in order to produce a pseudo 3D (three-dimensional) effect. In this case, by focusing both the eyes on the rear scene, it is possible to create an effect of showing the front scene separated away from the rear scene by a pseudo positional distance existing between the scenes as a distance proportional to the square of the actual positional distance between the scenes on a reproduced image seen by each one of the eyes.

FIG. 14 is diagrams showing models of reproduced images exhibiting an effect of assigned parallax/distance coefficients and other effects.

In addition to the pseudo 3D (three-dimensional) effect described above, image data can be processed to produce a zoom-up effect or a zoom-down effect, which is an effect opposite to the zoom-up effect. The zoom-up effect is an effect obtained as a result of applying a zoom-in process to a close image and a zoom-out process to a far image. In addition, by cutting out the image of a photographing object located at a specific distance from the entire image, the image processing can be carried out in a manner simpler than the chromakey technique.

In particular, FIG. 14A is a diagram showing data produced with assigned parallax/distance coefficients as data of a reproduced image. FIG. 14B is a diagram showing a result of extracting image data with the parallax/distance coefficient of IV from the data shown in FIG. 14A and enlarging an image represented by the extracted image data. In this case, however, image data with the parallax/distance coefficients of I and II is not processed and left as it is. As shown in FIG. 14B, the image portion represented by the pieces of image data shown as the capitals X, Y, Z and W is enlarged but the remaining image portions shown as notations and symbols are left as they are at their original sizes. In this way, an image completing a zoom-in process is obtained.

FIG. 14C is a diagram showing an image obtained as a result of extracting only image data with the parallax/distance coefficient of IV from the produced image data having assigned parallax/distance coefficients as shown in FIG. 14A and eliminating image data with the parallax/distance coefficients of I and II. That is to say, only, the image portion represented by the pieces of image data shown as the capitals X, Y, Z and W is displayed. In this way, by assigning parallax/distance coefficients to pieces of data representing the image of an object of photographing, the image of a portion cut out from the image of an object of photographing can be obtained.

FIG. 15 is diagrams showing typical images exhibiting effects other than the pseudo 3D (three-dimensional) effect obtained as a result of a process to assign parallax/distance coefficients to pieces of data representing the images. Much like the diagrams of FIG. 13, FIGS. 15A, 15B, and 15C show typical images demonstrating a pseudo 3D (three-dimensional) effect produced as a result of assigning parallax/distance coefficients in the image processing explained earlier by referring respective to FIGS. 9, 10, and 11.

FIGS. 15A to 15C each show a typical result of applying a zoom-in process to the image data of the mini car on the basis of the parallax/distance coefficient assigned to the image data and extracting the image data completing the zoom-in process. In this way, by assigning parallax/distance coefficients to pieces of data representing the image of an object of photographing, desired image processing can be carried out on the basis of the coefficients. Thus, unlike the conventional chromakey processing, after the image-taking process, a variety of processes based on by assigning parallax/distance coefficients can be carried out with ease. The processes carried out after the image-taking processes include a process to extract a desired portion from an area of a displayed image and a process to synthesize desired image portions.

As described above, in accordance with the image processing method provided by the present disclosure, the image processing device adopting the method and the image display apparatus employing the image processing device, main and auxiliary imagers provided by the present disclosure as well as the image processing device are integrated in the configuration of a single LSI circuit and, the LSI circuit carries out parallel processing to compare a signal generated by each horizontal register provided for the main imager with a signal generated by the corresponding horizontal register provided for the auxiliary imager so that the processing can be carried out at a speed higher than the speed of the ordinary parallax image-taking configuration and is suitable for an image process produce an image of high minuteness and a high rate.

By using such an LSI circuit including imagers and such an image processing device, it is possible to realize a Camcoder (a registered trademark of Sony Corporation) and a digital still camera, which are capable of recording information on parallaxes and distances along with image data.

In addition, in accordance with the image processing method provided by the present embodiments, by assigning distance coefficients based on parallaxes, a pseudo 3D (three-dimensional) effect can be realized even by using only one eye so that it is possible to get rid of restrictions on the actual visual-field angle without using special display means such as a both-eye 3D (three-dimensional) viewer.

Thus, it is possible to allow a number of observers to look at a display shown by only one display apparatus. It is also possible to provide a number of observers, who have different powers to view a display as well as a difference in visual ability between the two eyes, with a 3D (three-dimensional) effect of an image display allowing the observers to view a pseudo 3D (three-dimensional) image.

By virtue of such an image processing method and an image display apparatus employing the image processing device adopting the image processing method, an entertaining content such as a private movie or private video produced at home can be emphasized into a 3D (three-dimensional) display and, in addition, a 3D (three-dimensional) attendance feeling and a speed sense can be stressed in the case of a game image.

In addition, it should be understood by those skilled in the art that a variety of modifications, combinations, sub-combinations and alterations may occur in dependence on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing method including a process carried out by a pair of imagers, the method comprising:
    extracting a parallax, caused by a distance to an object of photographing, as a positional shift between mutually corresponding pixels included in said imagers or between mutually corresponding image blocks included in said imagers as blocks conforming to said mutually corresponding pixels; and
    assigning said parallax to image data as a distance coefficient found on the basis of said positional shift between said mutually corresponding pixels or said mutually corresponding image blocks in said imagers.

2. The image processing method according to claim 1, wherein assigning said distance coefficient to the image data includes normalizing said distance coefficient into a normalized coefficient proportional to said distance to said object of photographing.

3. The image processing method according to claim 1, wherein image processing based on said distance coefficient is carried out to generate a pseudo three-dimensional image.

4. The image processing method according to claim 1, wherein pixels or image blocks recognized such that said distance to said object of photographing is large on the basis of the assigned coefficient are shifted alternately to right and left in accordance with the distance with respect to each pixel or image block in the same horizontal coordinate.

5. The image processing method according to claim 1, wherein pixels or image blocks recognized such that said distance to said object of photographing is small on the basis of the assigned coefficient are shifted alternately to right and left in accordance with an inverse of the distance with respect to each pixel or image block in the same horizontal coordinate.

6. An image display apparatus comprising:
- a pair of imagers for extracting pieces of image data with different parallaxes each caused by a distance to an object of photographing;
- a coefficient assignment circuit for carrying out a process on pieces of image data with different parallaxes output by said imagers to assign a distance coefficient to said pieces of image data, the coefficient being obtained by extracting said parallaxes each according to a positional shift between a pixel or image block conforming to the pixel that generates said piece of image data on one of said imagers and a corresponding pixel or image block conforming to the corresponding pixel that generates said piece of image data on the other one of said imagers;
- an image processing circuit for creating a pseudo three-dimensional image from image data output by said coefficient assignment circuit; and
- an image display unit for displaying the pseudo three-dimensional image generated by said image processing circuit.

7. The image display apparatus according to claim 6, wherein said imagers and said coefficient assignment circuit are constructed in the same integrated circuit chip.

8. The image display apparatus according to claim 6, wherein said distance coefficient is normalized into a normalized coefficient according to the distance to said object of photographing.

9. The image display apparatus according to claim 6, wherein, after said distance coefficient obtained by extracting said parallaxes is assigned to said image data, said coefficient assignment circuit carries out image processing on said image data including said distance coefficient in order to display a pseudo three-dimensional image on said display unit.

10. The image display apparatus according to claim 6, wherein pixels or image blocks recognized such that said distance to said object of photographing is large on the basis of the assigned coefficient are shifted alternately to right and left in accordance with the distance with respect to each pixel or image block in the same horizontal coordinate.

11. The image display apparatus according to claim 6, wherein pixels or image blocks recognized such that said distance to said object of photographing is small on the basis of the assigned coefficient are shifted alternately to right and left in accordance with an inverse of the distance with respect to each pixel or image block in the same horizontal coordinate.

\* \* \* \* \*